US012306566B2

(12) United States Patent
Suzuki et al.

(10) Patent No.: US 12,306,566 B2
(45) Date of Patent: May 20, 2025

(54) INFORMATION PROCESSING APPARATUS FOR DETERMINING CAUSAL PART OF CAUSE OF ERROR WHICH HAS OCCURRED IN IMAGE FORMING APPARATUS, AND NOTIFICATION METHOD OF GIVING NOTIFICATION OF CAUSAL PART OF CAUSE OF ERROR WHICH HAS OCCURRED IN IMAGE FORMING APPARATUS

(71) Applicant: CANON KABUSHIKI KAISHA, Tokyo (JP)

(72) Inventors: Shinya Suzuki, Chiba (JP); Manabu Jimba, Ibaraki (JP); Takahiro Oonuma, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 18/470,303

(22) Filed: Sep. 19, 2023

(65) Prior Publication Data
US 2024/0103421 A1 Mar. 28, 2024

(30) Foreign Application Priority Data

Sep. 26, 2022 (JP) ................. 2022-152996
Sep. 26, 2022 (JP) ................. 2022-152999
Sep. 27, 2022 (JP) ................. 2022-153401

(51) Int. Cl.
*G03G 15/00* (2006.01)
*G06F 11/07* (2006.01)

(52) U.S. Cl.
CPC ......... *G03G 15/5079* (2013.01); *G03G 15/55* (2013.01); *G06F 11/0733* (2013.01); *G06F 11/0784* (2013.01); *G06F 11/0787* (2013.01)

(58) Field of Classification Search
CPC ................ G03G 15/5079; G03G 15/55; G06F 11/0733; G06F 11/0784; G06F 11/0787; G06F 3/1229; G06F 3/1234; H04N 1/00039; H04N 1/00344
See application file for complete search history.

(56) References Cited

U.S. PATENT DOCUMENTS

| 10,025,657 B2 | 7/2018 | Oku et al. ............. G06F 11/079 |
| 2013/0238598 A1* | 9/2013 | Miyazaki ........... G03G 15/5079 707/722 |
| 2023/0185226 A1* | 6/2023 | Suzuki .................. G03G 15/55 399/12 |

* cited by examiner

*Primary Examiner* — Sophia S Chen
(74) *Attorney, Agent, or Firm* — Venable LLP

(57) ABSTRACT

An information processing apparatus for communicating to and from a database having stored therein information on errors which have occurred in an image forming apparatus, the information processing apparatus includes at least one processor configured to acquire, from the database, information on a certain error and information on a related error which has occurred in past before the certain error, acquire first information related to a cumulative number of printed sheets of the image forming apparatus at a time of occurrence of the certain error, and second information related to a cumulative number of printed sheets of the image forming apparatus at a time of occurrence of the related error, and determine a causal part of a cause of the certain error based on the first information and the second information, and an output unit configured to output the causal part of the cause of the certain error.

19 Claims, 20 Drawing Sheets

| ERROR CODE | DETECTION CONTENTS | FAILURE MODE | PHENOMENON | FAILURE PART | OPERATION PERIOD (NUMBER OF PRINTED SHEETS) UNTIL REOCCURRENCE |
|---|---|---|---|---|---|
| Err001 | EVEN THOUGH CONTAINER DRIVE UNIT IS DRIVEN, OPERATION OF DEVELOPER REPLENISHMENT CONTAINER CANNOT BE DETECTED BY OPERATION STATE DETECTION UNIT FOR DEVELOPER REPLENISHMENT CONTAINER | A | DEVELOPER REPLENISHMENT CONTAINER IS NOT DRIVEN | DEVELOPER REPLENISHMENT CONTAINER, CONTAINER DRIVE UNIT | 10 SHEETS OR LESS |
| | | B | OPERATION STATE DETECTION UNIT CANNOT DETECT OPERATION | OPERATION STATE DETECTION UNIT | MORE THAN 10 SHEETS |
| Err002 | EVEN THOUGH CONTAINER DRIVE UNIT IS DRIVEN TO ROTATE IN REVERSE DIRECTION, OPEN STATE OF CONTAINER REPLENISHMENT DOOR CANNOT BE DETECTED BY OPEN/CLOSE DETECTION SENSOR | C, D | CONTAINER REPLACEMENT DOOR DOES NOT OPEN | CONTAINER DRIVE UNIT, LINK MEMBER, LINK SHAFT | 10 SHEETS OR LESS |
| | | E | OPEN/CLOSE DETECTION SENSOR CANNOT DETECT OPEN STATE | OPEN/CLOSE DETECTION SENSOR | MORE THAN 10 SHEETS |

FIG. 9

| DATE AND TIME OF ERROR OCCURRENCE | CUMULATIVE NUMBER OF RPINTED SHEETS | ERROR CODE |
|---|---|---|
| 2022/6/1 12:00 | 100010 | Err001 |
| 2022/6/2 10:00 | 100110 | Err001 |
| 2022/6/2 10:05 | 100110 | Err002 |

FIG. 10

| No. | ERROR-TO-BE -ANALYZED CODE | RELATED-ERROR CODE | DETERMINATION RANGE | FAILURE PATTERN | FAILURE PART |
|---|---|---|---|---|---|
| 1 | Err001 | Err001 | 10 SHEETS OR LESS | SUCCESSIVE | DEVELOPER REPLENISHMENT CONTAINER, CONTAINER DRIVE UNIT |
| 2 | Err001 | Err001 | MORE THAN 10 SHEETS AND EQUAL TO OR LESS THAN 1000 SHEETS | INTERMITTENT | OPERATION STATE DETECTION UNIT |
| 3 | Err001 | Err001 | NO OCCURRENCE IN 1000 SHEETS OR LESS | NO OCCURRENCE | DEVELOPER REPLENISHMENT CONTAINER, CONTAINER DRIVE UNIT, OPERATION STATE DETECTION UNIT |
| 4 | Err002 | Err001 | 10 SHEETS OR LESS | SUCCESSIVE | CONTAINER DRIVE UNIT |
| 5 | Err002 | Err001 | MORE THAN 10 SHEETS AND EQUAL TO OR LESS THAN 1000 SHEETS | INTERMITTENT | CONTAINER DRIVE UNIT |
| 6 | Err002 | Err001 | NO OCCURRENCE IN 1000 SHEETS OR LESS | NO OCCURRENCE | CONTAINER DRIVE UNIT, LINK MEMBER, LINK SHAFT, OPEN/CLOSE DETECTION SENSOR |
| 7 | Err002 | Err002 | 10 SHEETS OR LESS | SUCCESSIVE | CONTAINER DRIVE UNIT, LINK MEMBER, LINK SHAFT, |
| 8 | Err002 | Err002 | MORE THAN 10 SHEETS AND EQUAL TO OR LESS THAN 1000 SHEETS | INTERMITTENT | OPEN/CLOSE DETECTION SENSOR |
| 9 | Err002 | Err002 | NO OCCURRENCE IN 1000 SHEETS OR LESS | NO OCCURRENCE | CONTAINER DRIVE UNIT, LINK MEMBER, LINK SHAFT, OPEN/CLOSE DETECTION SENSOR |

FIG. 12

| ERROR CODE | DETECTION CONTENTS | FAILURE MODE | PHENOMENON | FAILURE PART | OPERATION PERIOD (NUMBER OF PRINTED SHEETS) UNTIL REOCCURRENCE | | THRESHOLD VALUE | |
|---|---|---|---|---|---|---|---|---|
| | | | | | LOWER LIMIT VALUE | UPPER LIMIT VALUE | A | B |
| Err001 | EVEN THOUGH CONTAINER DRIVE UNIT IS DRIVEN, OPERATION OF DEVELOPER REPLENISHMENT CONTAINER CANNOT BE DETECTED BY OPERATION STATE DETECTION UNIT FOR DEVELOPER REPLENISHMENT CONTAINER | A | DEVELOPER REPLENISHMENT CONTAINER IS NOT DRIVEN | DEVELOPER REPLENISHMENT CONTAINER, CONTAINER DRIVE UNIT | 0 SHEETS OR MORE | 10 SHEETS OR LESS | 10 | 1000 |
| | | B | OPERATION STATE DETECTION UNIT CANNOT DETECT OPERATION | OPERATION STATE DETECTION UNIT | MORE THAN 10 SHEETS | 1000 SHEETS OR LESS | | |
| Err002 | EVEN THOUGH CONTAINER DRIVE UNIT IS DRIVEN TO ROTATE IN REVERSE DIRECTION, OPEN STATE OF CONTAINER REPLACEMENT DOOR CANNOT BE DETECTED BY OPEN/CLOSE DETECTION SENSOR | C, D | CONTAINER REPLACEMENT DOOR DOES NOT OPEN | CONTAINER DRIVE UNIT, LINK MEMBER, LINK SHAFT | 0 SHEETS OR MORE | 50 SHEETS OR LESS | 50 | 1000 |
| | | E | OPEN/CLOSE DETECTION SENSOR CANNOT DETECT OPEN STATE | OPEN/CLOSE DETECTION SENSOR | MORE THAN 50 SHEETS | 1000 SHEETS OR LESS | | |

FIG. 18

| ERROR CODE | DETECTION CONTENTS | FAILURE MODE | PHENOMENON | FAILURE PART | OPERATION PERIOD (NUMBER OF PRINTED SHEETS) UNTIL REOCCURRENCE | | THRESHOLD VALUE | |
|---|---|---|---|---|---|---|---|---|
| | | | | | LOWER LIMIT VALUE | UPPER LIMIT VALUE | A | B |
| Err0010 | EVEN THOUGH CONTAINER DRIVE UNIT FOR CHROMATIC COLOR IS DRIVEN, OPERATION OF DEVELOPER REPLENISHMENT CONTAINER CANNOT BE DETECTED BY OPERATION STATE DETECTION UNIT FOR DEVELOPER REPLENISHMENT CONTAINER | A | DEVELOPER REPLENISHMENT CONTAINER FOR CHROMATIC COLOR IS NOT DRIVEN | DEVELOPER REPLENISHMENT CONTAINER FOR CHROMATIC COLOR, CONTAINER DRIVE UNIT FOR CHROMATIC COLOR | 0 SHEETS OR MORE | 10 SHEETS OR LESS | 10 | |
| | | B | OPERATION STATE DETECTION UNIT FOR CHROMATIC COLOR CANNOT DETECT OPERATION | OPERATION STATE DETECTION UNIT FOR CHROMATIC COLOR | MORE THAN 10 SHEETS | 1000 SHEETS OR LESS | | 1000 |
| Err0030 | EVEN THOUGH CONTAINER DRIVE UNIT FOR BLACK IS DRIVEN, OPERATION OF DEVELOPER REPLENISHMENT CONTAINER CANNOT BE DETECTED BY OPERATION STATE DETECTION UNIT FOR DEVELOPER REPLENISHMENT CONTAINER | A | DEVELOPER REPLENISHMENT CONTAINER FOR BLACK IS NOT DRIVEN | DEVELOPER REPLENISHMENT CONTAINER FOR BLACK, CONTAINER DRIVE UNIT FOR BLACK | 0 SHEETS OR MORE | 50 SHEETS OR LESS | 50 | |
| | | B | OPERATION STATE DETECTION UNIT FOR BLACK CANNOT DETECT OPERATION | OPERATION STATE DETECTION UNIT FOR BLACK | 50 SHEETS OR MORE | 300 SHEETS OR LESS | | 300 |

FIG. 19

| No. | ERROR-TO-BE-ANALYZED CODE | RELATED-ERROR CODE | DETERMINATION RANGE | FAILURE PATTERN | FAILURE PART |
|---|---|---|---|---|---|
| 1 | Err0010 | Err0010 | 10 SHEETS OR LESS | SUCCESSIVE | DEVELOPER REPLENISHMENT CONTAINER FOR CHROMATIC COLOR, CONTAINER DRIVE UNIT FOR CHROMATIC COLOR |
| 2 | Err0010 | Err0010 | MORE THAN 10 SHEETS AND EQUAL TO OR LESS THAN 1000 SHEETS | INTERMITTENT | OPERATION STATE DETECTION UNIT FOR CHROMATIC COLOR |
| 3 | Err0010 | Err0010 | NO OCCURRENCE IN 1000 SHEETS OR LESS | NO OCCURRENCE | DEVELOPER REPLENISHMENT CONTAINER FOR CHROMATIC COLOR, CONTAINER DRIVE UNIT FOR CHROMATIC COLOR, OPERATION STATE DETECTION UNIT FOR CHROMATIC COLOR |
| 4 | Err0030 | Err0030 | 10 SHEETS OR LESS | SUCCESSIVE | DEVELOPER REPLENISHMENT CONTAINER FOR BLACK, CONTAINER DRIVE UNIT FOR BLACK |
| 5 | Err0030 | Err0030 | MORE THAN 10 SHEETS AND EQUAL TO OR LESS THAN 300 SHEETS | INTERMITTENT | OPERATION STATE DETECTION UNIT FOR BLACK |
| 6 | Err0030 | Err0030 | NO OCCURRENCE IN 300 SHEETS OR LESS | NO OCCURRENCE | DEVELOPER REPLENISHMENT CONTAINER FOR BLACK, CONTAINER DRIVE UNIT FOR BLACK, OPERATION STATE DETECTION UNIT FOR BLACK |

FIG. 20

INFORMATION PROCESSING APPARATUS FOR DETERMINING CAUSAL PART OF CAUSE OF ERROR WHICH HAS OCCURRED IN IMAGE FORMING APPARATUS, AND NOTIFICATION METHOD OF GIVING NOTIFICATION OF CAUSAL PART OF CAUSE OF ERROR WHICH HAS OCCURRED IN IMAGE FORMING APPARATUS

BACKGROUND OF THE INVENTION

Field of the Invention

The present disclosure relates to an information processing apparatus capable of communicating to and from an image forming apparatus, and a notification method of giving a notification of a causal part of a cause of an error which has occurred in an image forming apparatus.

Description of the Related Art

An image forming apparatus experiencing a failure is repaired by a customer engineer (hereinafter referred to as "CE") who visits a place in which the image forming apparatus is installed. How long it takes to identify a cause of the failure and finish correctly dealing with the failure varies depending on the CE's capability. A time required to repair the image forming apparatus consequently varies depending on a CE dealing with the failure. In order to shorten the time required for the repair, a technology for deducing a cause of a failure based on in-machine data indicating a state of an image forming apparatus and notifying required processing has been proposed (U.S. Pat. No. 10,025,657). The in-machine data is information indicating a state inside the image forming apparatus, for example, a detected value obtained by a sensor provided in the image forming apparatus, or error occurrence information.

In U.S. Pat. No. 10,025,657, there is disclosed a failure diagnosis method using a diagnosis model generated based on a correspondence relationship between a cause of a predetermined failure and a sensor exhibiting a characteristic change in an output value. In this failure diagnosis method, a sensor exhibiting a change in an output value (data pattern) determined in advance is searched for from changes in output values of respective sensors obtained before the occurrence of the failure so that the cause of the failure corresponding to this sensor is identified. However, the failure diagnosis method as described in U.S. Pat. No. 10,025,657 has a problem in that the cause of the failure cannot be diagnosed unless the correspondence relationship between the cause of the failure and the sensor is determined in advance.

SUMMARY OF THE INVENTION

An information processing apparatus, according to the present disclosure, for communicating to and from a database having stored therein information on errors which have occurred in an image forming apparatus includes, at least one processor configured to acquire, from the database, information on a certain error and information on a related error which has occurred in past before the certain error, acquire first information related to a cumulative number of printed sheets of the image forming apparatus at a time of occurrence of the certain error, and second information related to a cumulative number of printed sheets of the image forming apparatus at a time of occurrence of the related error, and determine a causal part of a cause of the certain error based on the first information and the second information; and an output unit configured to output the causal part of the cause of the certain error, which is determined by the at least one processor.

Further, a notification method of giving a notification of a causal part of a cause of an error which has occurred in an image forming apparatus according to the present disclosure includes selecting information on an error from a database having stored therein information related to errors which have occurred in the image forming apparatus; acquiring, from the database, information on a related error which has occurred in past before the selected error; acquiring first information related to a cumulative number of printed sheets of the image forming apparatus at a time of occurrence of the selected error, and second information related to a cumulative number of printed sheets of the image forming apparatus at a time of occurrence of the related error; and giving a notification of a causal part of a cause of the selected error based on the first information and the second information.

Further features of the present invention will become apparent from the following description of exemplary embodiments (with reference to the attached drawings).

BRIEF DESCRIPTION OF THE DRAWINGS

FIG. 9 is an explanatory table of error codes.

FIG. 10 is an exemplary table of error-related information.

FIG. 12 is an exemplary diagram of a failure deduction table.

FIG. 18 is an explanatory table of error codes.

FIG. 19 is an explanatory table of error codes.

FIG. 20 is an exemplary diagram of a failure deduction table.

DESCRIPTION OF THE EMBODIMENTS

Now, referring to the accompanying drawings, description is given of exemplary embodiments of the present disclosure. The present disclosure is more specifically described by way of embodiments, which are examples of the exemplary embodiments in the present disclosure. However, the present disclosure is not limited exclusively to configurations of those embodiments.

First Embodiment

<Configuration of Image Forming Apparatus>

Figure 1:
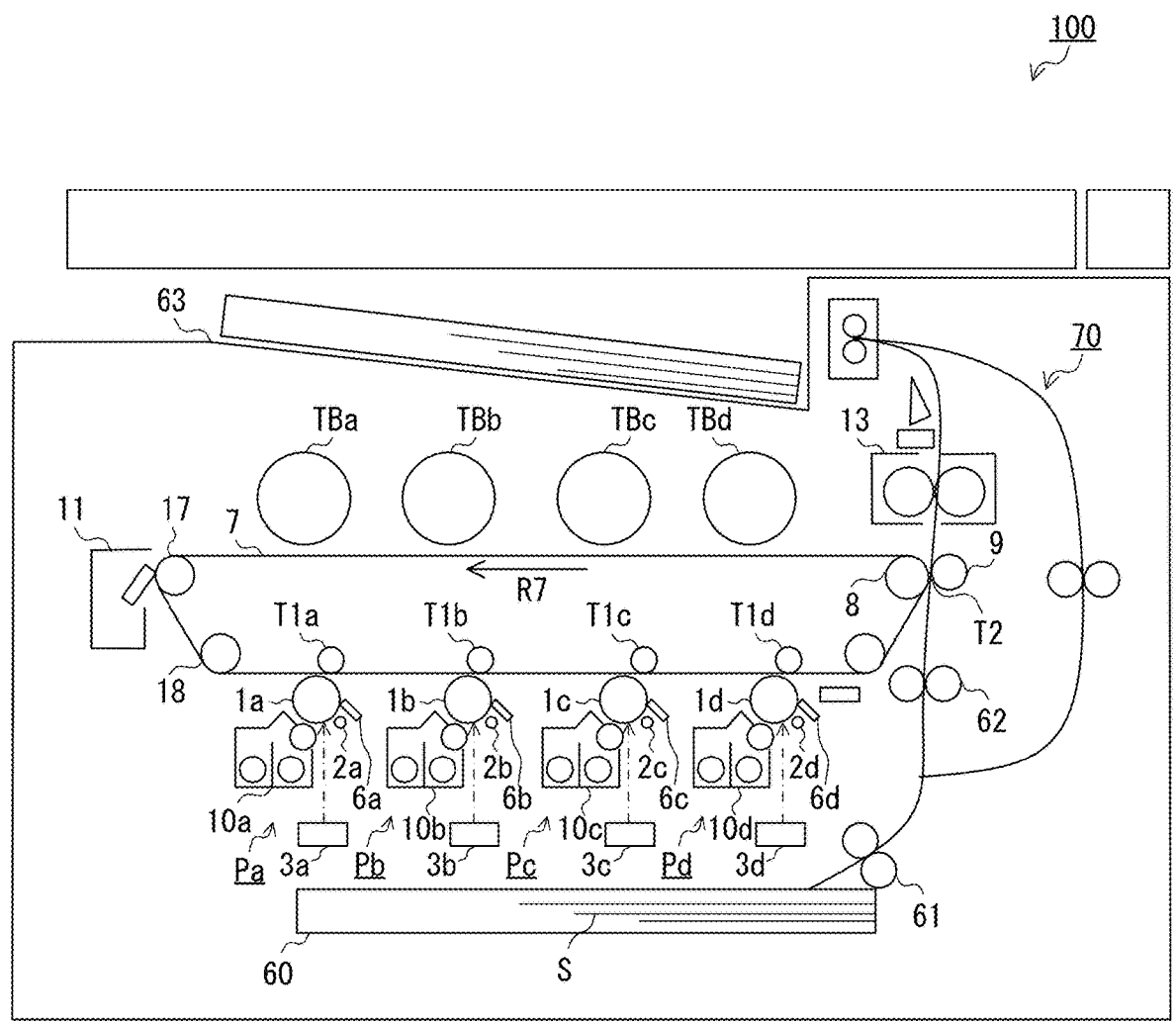
FIG. 1 is a configuration view of an image forming apparatus.

FIG. 1 is a configuration view of an image forming apparatus in a first embodiment of the present disclosure. An image forming apparatus 100 operates through use of an electrophotographic system, and forms a color image onto a sheet S. The image forming apparatus 100 adopts an intermediate transfer tandem system in which a plurality of image forming units are arranged along a surface of an intermediate transfer belt 7 onto which an image is to be transferred. The image forming apparatus 100 in the first embodiment includes four image forming units Pa, Pb, Pc, and Pd in order to form images of four colors of yellow, magenta, cyan, and black, respectively. Such an image forming apparatus 100 is achieved by a printer, a copying machine, a multifunctional peripheral, a fax machine, or the like.

The sheet S is stored in a sheet storage 60, and is fed by sheet feeding rollers 61 adopting a friction separating system, in accordance with the timing to form images by the image forming units Pa to Pd. The sheet feeding rollers 61 convey the sheet S fed from the sheet storage 60 to registration rollers 62 through a conveyance path. The registration rollers 62 correct skew feeding of the sheet S, and adjust the timing to convey the sheet S to a secondary transfer portion T2.

The image forming units Pa to Pd are only different from each other in colors of images to be formed, and have similar configurations and perform similar operations to form the images. The image forming units Pa to Pd include photosensitive members 1a to 1d, charging devices 2a to 2d, exposing devices 3a to 3d, developing devices 10a to 10d, primary transfer portions T1a to T1d, and photosensitive member cleaners 6a to 6d, respectively. In the following, when description is given without distinguishing the colors, symbols "a", "b", "c", and "d" at ends of the reference symbols are omitted.

The photosensitive member 1 has a drum shape including a photosensitive layer on its surface, and is driven to rotate about a drum shaft. The charging device 2 uniformly charges the surface of the rotating photosensitive member 1. The exposing device 3 applies light modulated in accordance with image data for the color to be formed onto each of the uniformly-charged surfaces of the photosensitive members 1a to 1d. In this manner, an electrostatic latent image corresponding to the image data is formed on the surface of the photosensitive member 1.

The developing device 10 develops the electrostatic latent image formed on the photosensitive member 1 through use of developer. In the first embodiment, toner is used as the developer. The developing device 10 causes toner to adhere to the electrostatic latent image formed on the photosensitive member 1, to thereby form a toner image on the photosensitive member 1. In the image forming unit Pa, the developing device 10a stores yellow developer so that a yellow toner image is generated. In the image forming unit Pb, the developing device 10b stores magenta developer so that a magenta toner image is generated. In the image forming unit Pc, the developing device 10c stores cyan developer so that a cyan toner image is generated. In the image forming unit Pd, the developing device 10d stores black developer so that a black toner image is generated. The number of colors of toner images to be formed in the image forming apparatus 100 is not limited to four.

Each of the developing devices 10a to 10d in the first embodiment stores two-component developer in which non-magnetic toner and magnetic carriers are mixed, but the developer may be a one-component developer containing only magnetic toner or only non-magnetic toner. In each of the developing devices 10a to 10d, when an amount of developer stored therein is reduced to be smaller than a predetermined amount through image formation, the developing device is repeatedly replenished with the developer from a developer storing unit. In the developer storing unit, when the amount of developer stored therein is reduced to be smaller than the predetermined amount, the developer storing unit is repeatedly replenished with developer of a corresponding color from each of developer replenishment containers TBa to TBd serving as a replenishment container of the developer. Details of a configuration of a developer replenishment system formed of the developer replenishment container TB, the developer storing unit, and the developing device 10 are described later.

With the developer replenishment system, each of the developing devices 10a to 10d can have an amount of developer stored therein stabilized with respect to a predetermined reference amount. With the amount of developer stored therein being stabilized, the developing devices 10a to 10d can stabilize toner amounts to be caused to adhere to the photosensitive members 1a to 1d, respectively. Accordingly, toner amounts of toner images to be formed on the respective photosensitive members 1a to 1d are stabilized, and thus image densities are stabilized.

At the primary transfer portion T1, a predetermined amount of pressure in a direction of the intermediate transfer belt 7 and an electrostatic load bias are applied so that a toner image is transferred from each of the photosensitive members 1a to 1d onto the intermediate transfer belt 7. At this time, the toner images formed on the respective photosensitive members 1a to 1d are superimposed on each other on the intermediate transfer belt 7. Toner remaining on the photosensitive members 1a to 1d after the transfer is collected by the photosensitive member cleaners 6a to 6d.

When the toner images of respective colors of yellow, magenta, cyan, and black are transferred onto the intermediate transfer belt 7 in superimposition, the intermediate transfer belt 7 bears multi-color toner images. The intermediate transfer belt 7 is an endless belt which is provided on an intermediate transfer belt frame (not shown), and is stretched by a secondary transfer inner roller 8, a tension roller 17, and a secondary transfer upstream roller 18. The intermediate transfer belt 7 is driven to rotate in a direction of an arrow R7 by the secondary transfer inner roller 8, the tension roller 17, and the secondary transfer upstream roller 18. The intermediate transfer belt 7 having the multi-color toner images transferred thereon is rotated so as to convey those multi-color toner images to the secondary transfer portion T2.

The sheet S and the multi-color toner images formed on the intermediate transfer belt 7 are conveyed at timings matching each other at the secondary transfer portion T2. The secondary transfer portion T2 is a transfer nip portion formed by the secondary transfer inner roller 8 and a secondary transfer outer roller 9 which are arranged so as to be opposed to each other. A predetermined pressure force and an electrostatic load bias are applied to the secondary transfer portion T2 so that the multi-color toner images are adsorbed from the intermediate transfer belt 7 onto the sheet S. In this manner, the secondary transfer portion T2 transfers the multi-color toner images formed on the intermediate transfer belt 7 onto the sheet S. Toner remaining on the intermediate transfer belt 7 after the transfer is collected by a transfer cleaner 11.

The sheet S having the multi-color toner images transferred thereon is conveyed by the secondary transfer outer roller 9 from the secondary transfer portion T2 to a fixing device 13. The fixing device 13 applies a predetermined pressure and a predetermined amount of heat to the sheet S in a fixing nip formed by opposing rollers, to thereby melt and fix the multi-color toner images onto the sheet S. The multi-color toner images develop their colors at the time of being melted and fixed so as to become a full-color toner image. The fixing device 13 includes a heater serving as a heat source, and is controlled to always maintain an optimum temperature.

The sheet S having the full-color toner image fixed thereto is discharged onto a discharge tray 63. In a case of duplex printing, a sheet S having an image formed on one surface thereof is reversed by a reverse conveyance mechanism 70 so as to be conveyed to the registration rollers 62, and thus image formation onto the other surface is performed. As described above, the image forming apparatus 100 performs image forming processing of forming an image onto a sheet based on image data.

<Controller>

Figure 2:
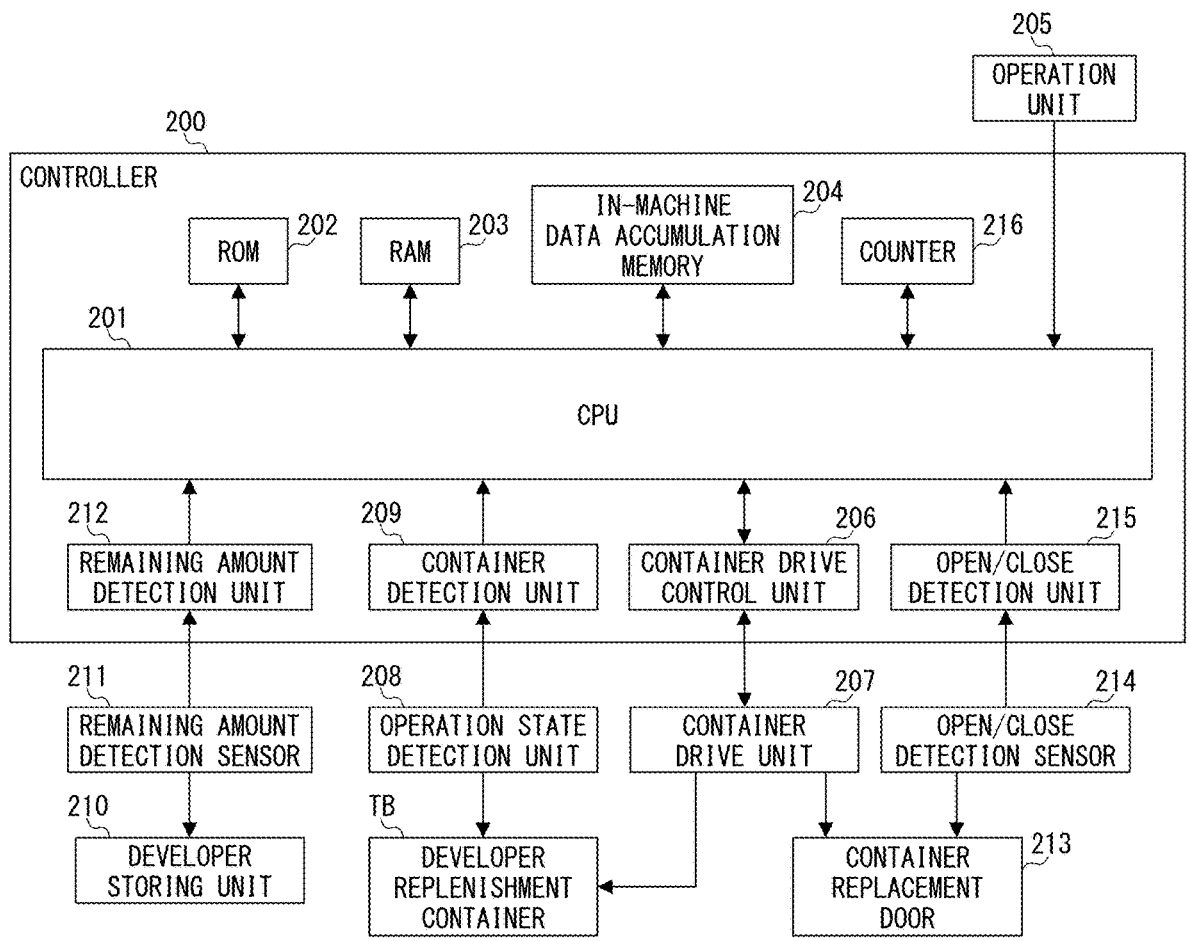
FIG. 2 is a configuration diagram of a controller.

FIG. 2 is a configuration diagram of a controller for controlling an overall operation of the image forming apparatus 100 configured as described above. A controller 200 of FIG. 2 shows a configuration for controlling replenishment of the developer, and configurations for other functions, for example, a function of controlling the image forming processing, are omitted.

The controller 200 is an information processing apparatus including a central processing unit (CPU) 201, a read only memory (ROM) 202, and a random access memory (RAM) 203. A container drive control unit 206, a container detection unit 209, a remaining amount detection unit 212, an open/close detection unit 215, an in-machine data accumulation memory 204, an operation unit 205, and a counter 216 are connected to the CPU 201.

The CPU 201 executes a computer program stored in the ROM 202 so as to perform various types of processing by the image forming apparatus 100. In this manner, the CPU 201 controls each device of the image forming apparatus 100. For example, the CPU 201 forms a full-color image which is based on image data onto the sheet S. The RAM 203 provides a work area used when the CPU 201 performs the processing, and stores temporary data or the like. The in-machine data accumulation memory 204 is a storage device for storing (accumulating) in-machine data such as the date and time at the time of occurrence of an error, a count value, and an error code. The count value is a value (parameter) indicating an operation state at the time of occurrence of the error of the image forming apparatus 100. The count value is, for example, a cumulative number of printed sheets obtained by the image forming apparatus 100 or a cumulative number of times of replenishment of the developer replenishment container TB. The count value is a result value obtained by counting, by the counter 216, for example, the cumulative number of printed sheets obtained by the image forming apparatus 100 or the cumulative number of times of replenishment of the developer replenishment container TB.

The operation unit 205 is a user interface including an input interface and an output interface. The input interface is various key buttons, a touch panel, and the like. The output interface is a display, a speaker, and the like. A user inputs various instructions or data through the input interface of the operation unit 205. The user can check the notification or the state of the image forming apparatus 100 through the output interface of the operation unit 205.

The container drive control unit 206 controls a container drive unit 207 in response to an instruction from the CPU 201. The container drive unit 207 includes a drive source for driving the developer replenishment container TB and opening a container replacement door 213. The container drive unit 207 performs switching between forward rotation and reverse rotation of one drive source so as to exclusively transmit a drive force to two different loads, in this case, the developer replenishment container TB and the container replacement door 213. The container drive unit 207 is supplied with a current by the container drive control unit 206 so as to be driven, to thereby drive the developer replenishment container TB. The container drive unit 207 is supplied with a current in a direction reverse to that at the time of driving the developer replenishment container TB by the container drive control unit 206 so as to be driven in a rotation direction reverse to that at the time of driving the developer replenishment container TB, to thereby open the container replacement door 213. The container replacement door 213 is a door to be opened at the time of replacement of the developer replenishment container TB, and is provided, for example, on the front side of the image forming apparatus 100.

The container detection unit 209 controls an operation state detection unit 208 in response to an instruction from the CPU 201. The operation state detection unit 208 is an operation monitoring unit including a sensor for detecting the drive of the developer replenishment container TB. The sensor included in the operation state detection unit 208 is, for example, an optical-type photosensor. The operation state detection unit 208 detects a drive state of the developer replenishment container TB so as to transfer a detection signal representing this drive state to the container detection unit 209. The container detection unit 209 transmits a detection result obtained by the operation state detection unit 208 to the CPU 201.

While the CPU 201 transmits the drive signal to the container drive control unit 206 so as to drive the container drive unit 207, the CPU 201 acquires the detection result obtained by the operation state detection unit 208. The CPU 201 detects an abnormality (error) when, even though the drive signal is transmitted to the container drive control unit 206, the detection result obtained by the operation state detection unit 208 indicates that the developer replenishment container TB is not driven. At this time, the CPU 201 determines that a failure has occurred, and thus performs error display onto the operation unit 205. At the same time, the CPU 201 accumulates, as the in-machine data, the error code assigned in advance in accordance with the type of the error, the date and time at which the error has occurred, and the count value indicating the operation state of the image forming apparatus 100, which has been counted by the counter 216, into the in-machine data accumulation memory 204.

The error indicating that the developer replenishment container TB is not driven has an error code that is set to vary among respective colors of yellow, magenta, cyan, and black. That is, a drive error of the yellow developer replenishment container TB a, a drive error of the magenta developer replenishment container TBb, a drive error of the cyan developer replenishment container TBc, and a drive error of the black developer replenishment container TBd are assigned error codes that are different from each other.

The remaining amount detection unit 212 controls a remaining amount detection sensor 211 in response to an instruction from the CPU 201. The remaining amount detection sensor 211 is a sensor for detecting an amount of developer in a developer storing unit 210. The remaining amount detection sensor 211 is a sensor such as a piezoelectric element-type powder level sensor including piezoelectric ceramics and a vibrating structure.

The remaining amount detection sensor 211 transmits a detection signal indicating a detection result of the developer amount in the developer storing unit 210 to the remaining amount detection unit 212. The remaining amount detection unit 212 transmits the detection result obtained by the remaining amount detection sensor 211 to the CPU 201. The CPU 201 acquires the detection result obtained by the remaining amount detection sensor 211 during the image forming operation. When the detection result obtained by the remaining amount detection sensor 211 indicates that the developer amount in the developer storing unit 210 is small, the CPU 201 transmits a drive signal to the container drive control unit 206, to thereby drive the container drive unit 207 to supply the developer to the developer storing unit 210.

When the developer replenishment container TB gets empty, the user or the CE performs an operation of replacing the developer replenishment container TB. At this time, the CPU 201 displays a replacement button onto the operation unit 205. When the CPU 201 detects that this replacement button is pressed, the CPU 201 transmits a drive signal to the container drive control unit 206 so that the container drive unit 207 rotates in a direction reverse to that at the time of driving the developer replenishment container TB. In this manner, the container drive unit 207 opens the container replacement door 213.

The container replacement door 213 is a door for preventing access to the developer replenishment container TB from the outside so that the replacement work is performed only when the developer replenishment container TB gets empty. An open/close state of the container replacement door 213 is detected by an open/close detection sensor 214. The open/close detection sensor 214 is a state monitoring unit formed of, for example, an optical-type photosensor. The open/close detection sensor 214 transmits a detection signal indicating a detection result of the open/close state of the container replacement door 213 to the open/close detection unit 215. The open/close detection unit 215 transmits the detection result obtained by the open/close detection sensor 214 to the CPU 201.

After the CPU 201 transmits the drive signal to the container drive control unit 206 so as to open the container replacement door 213, the CPU 201 acquires the detection result obtained by the open/close detection sensor 214. When the detection result obtained by the open/close detection sensor 214 indicates that the container replacement door 213 is brought to the open state, the CPU 201 stops the drive signal transmitted to the container drive control unit 206.

When the detection result obtained by the open/close detection sensor 214 indicates that the container replacement door 213 is not brought to the open state even though the drive signal is transmitted to the container drive control unit 206 for a predetermined time period, the CPU 201 determines that a failure has occurred, and thus performs error display onto the operation unit 205. At the same time, the CPU 201 accumulates, as the in-machine data, the error code assigned in advance in accordance with the type of the error, the date and time at which the error has occurred, and the count value indicating the operation state of the image forming apparatus 100, which has been counted by the counter 216, into the in-machine data accumulation memory 204.

<Developer Replenishment Operation>

Figure 3:
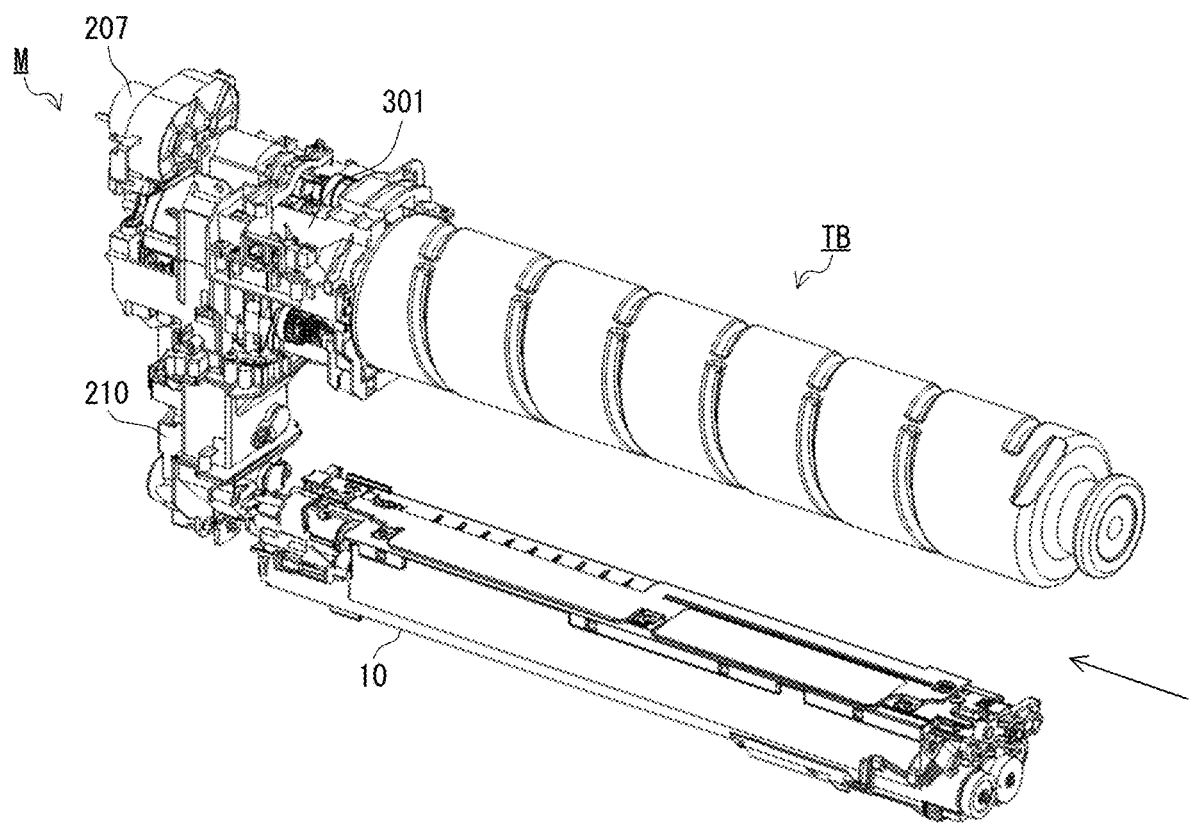
FIG. 3 is an overall configuration view of a developer replenishment system.
Figure 4:
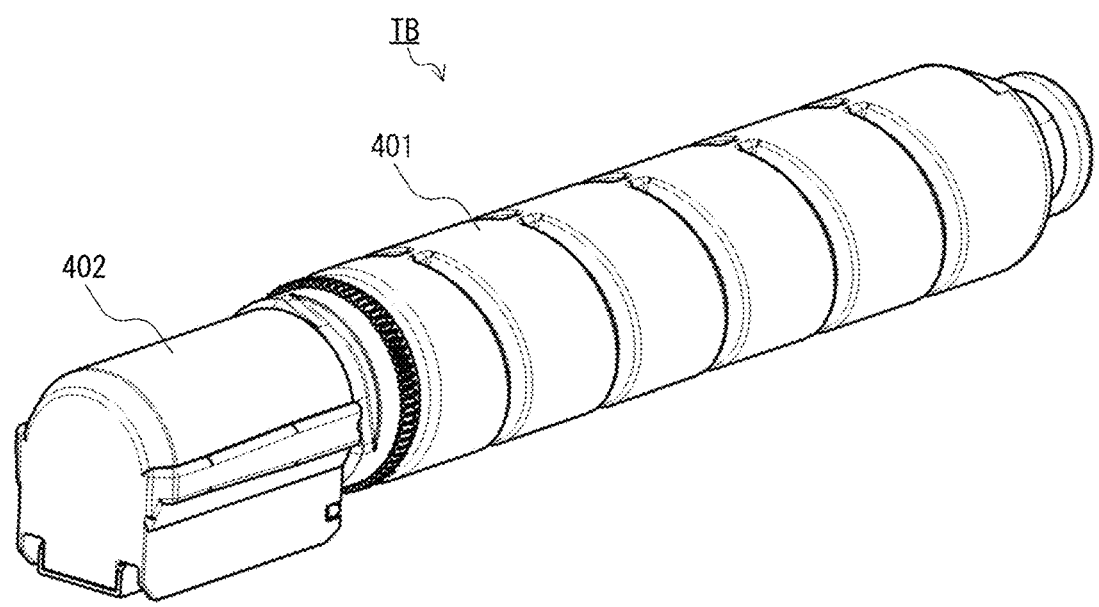
FIG. 4 is an external appearance view of a developer replenishment container.
Figure 5:
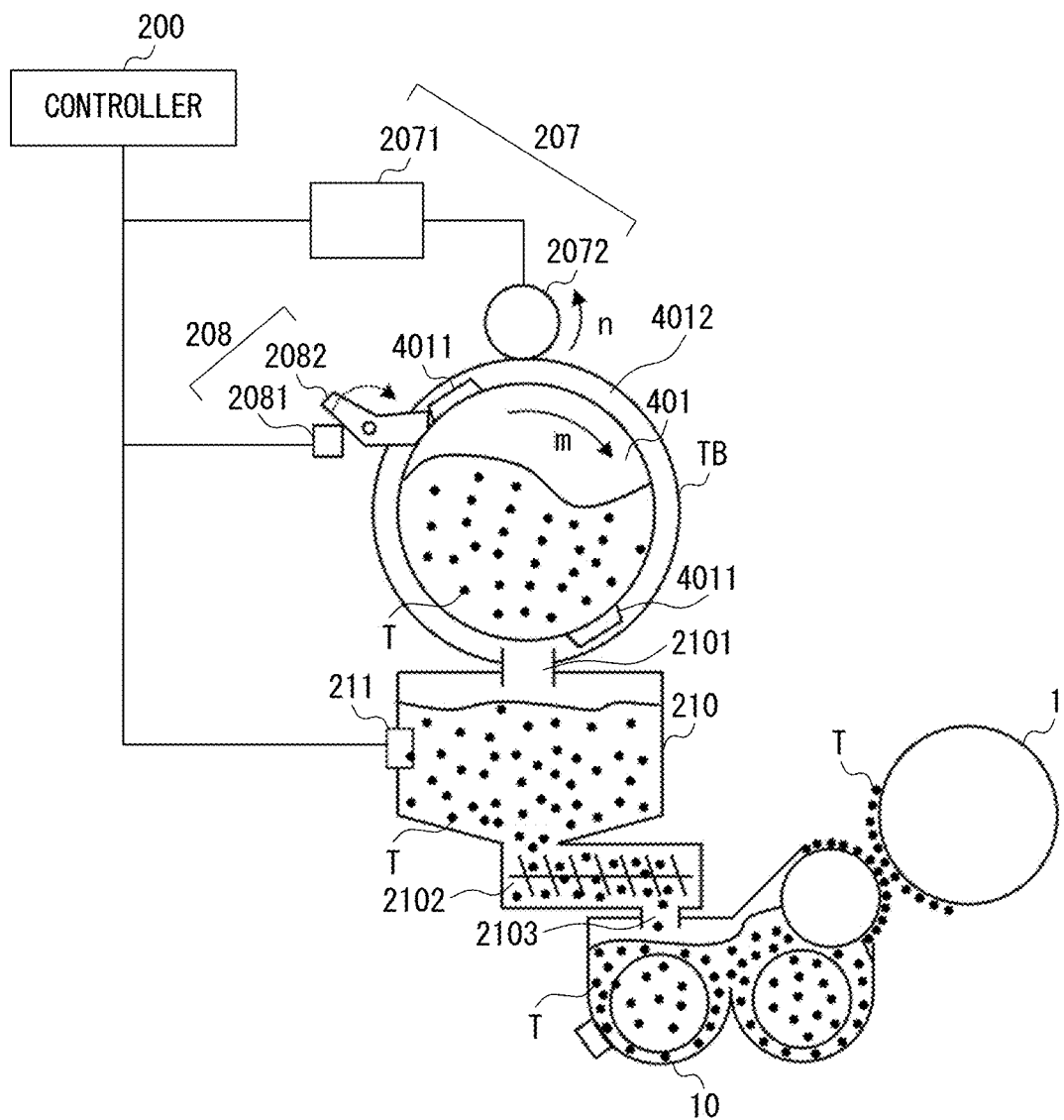
FIG. 5 is a cross-sectional view of the developer replenishment system.
Figure 6:
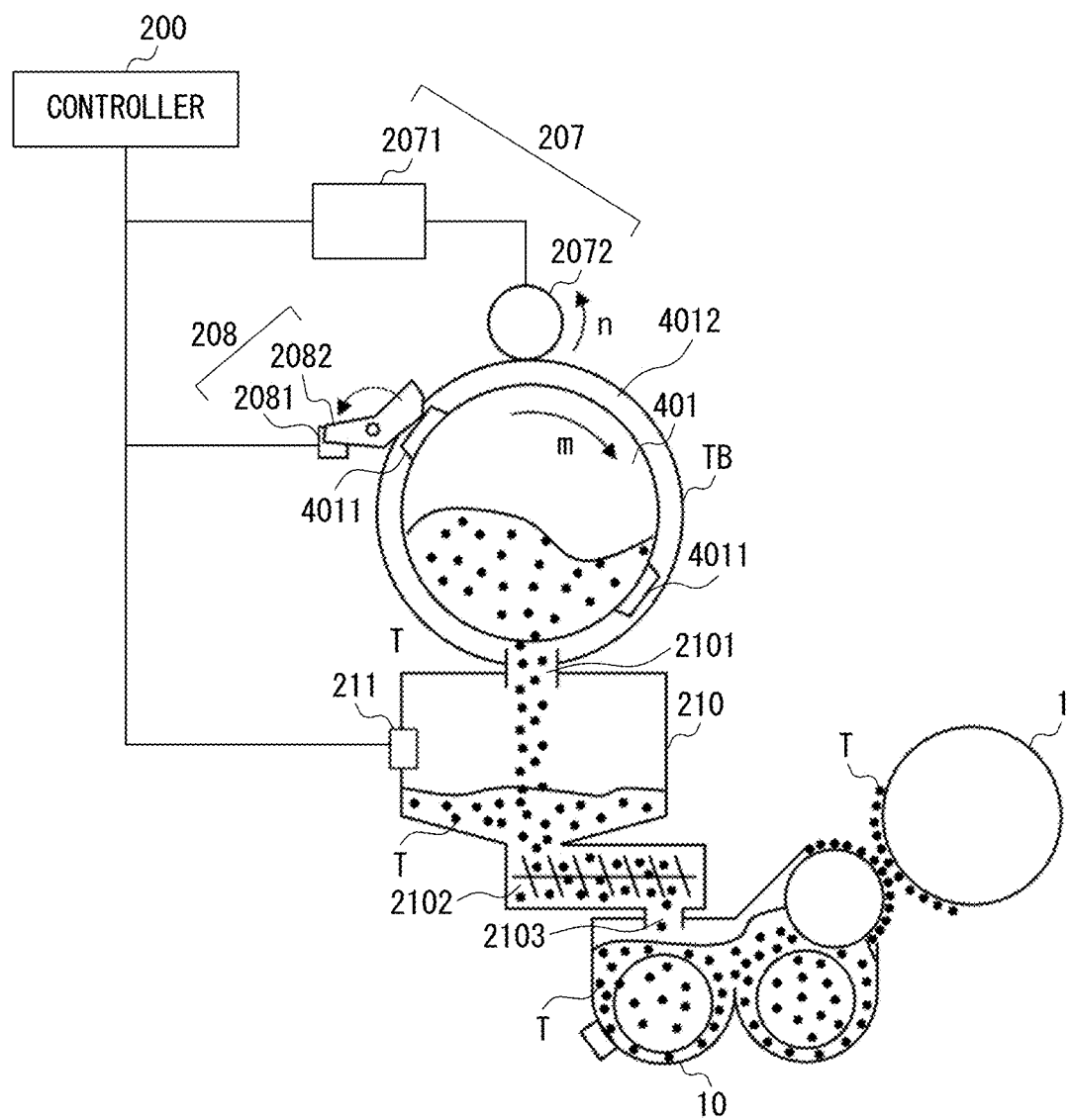
FIG. 6 is a cross-sectional view of the developer replenishment system.

The developer replenishment system and the replenishment operation are described with reference to FIG. 3 to FIG. 6. FIG. 3 is an overall configuration view of the developer replenishment system. FIG. 4 is an external appearance view of the developer replenishment container TB. FIG. 5 and FIG. 6 are cross-sectional views of the developer replenishment system.

As illustrated in FIG. 3, the developer replenishment system in the first embodiment mainly includes the container drive unit 207, a container holding unit 301, and the developer storing unit 210. The container holding unit 301 holds the developer replenishment container TB inside the image forming apparatus 100. The container drive unit 207 drives the developer replenishment container TB. The developer storing unit 210 stores a certain amount of developer T, and supplies the developer to the developing device 10.

The developer replenishment container TB is freely mountable to and removable from the image forming apparatus 100. As illustrated in FIG. 4, the developer replenishment container TB includes a held unit 402 and a developer accommodation unit 401. The held unit 402 is to be held by the container holding unit 301 under a state of being mounted to the image forming apparatus 100. The developer accommodation unit 401 is rotatable relative to the held unit 402.

As illustrated in FIG. 5, the container drive unit 207 includes a drive motor 2071 and a drive transmission portion 2072. The drive motor 2071 is driven by a drive signal output from the CPU 201. The drive transmission portion 2072 transmits a drive force of the drive motor 2071 to the developer replenishment container TB. The developer accommodation unit 401 accommodates therein the developer T for replenishment. The developer accommodation unit 401 has a drive receiving portion 4012 and a protruding portion 4011 provided thereto. The drive receiving portion 4012 is provided at a part of an outer peripheral portion of the developer accommodation unit 401 so as to receive the drive force from the container drive unit 207. The protruding portion 4011 is brought into abutment against a detection flag 2082 to be described later.

The developer storing unit 210 is provided so as to store a certain amount of developer T in order to stably supply the developer T to the developing device 10. The developer storing unit 210 includes a receiving portion 2101, the remaining amount detection sensor 211, a conveyance portion 2102, and an ejection port 2103. The receiving portion 2101 is provided at an upper portion of the developer storing unit 210 so as to receive the developer T ejected from the developer replenishment container TB. The remaining amount detection sensor 211 is provided at a substantially center portion of the developer storing unit 210 so as to detect the remaining amount of developer T therein. The conveyance portion 2102 and the ejection port 2103 are provided at portions below the remaining amount detection sensor 211 so as to convey the developer T to the developing device 10.

The container holding unit 301 (see FIG. 3) is provided at a portion above the developer storing unit 210. The container holding unit 301 includes the above-mentioned operation state detection unit 208 for monitoring the operation state of the developer replenishment container TB. The operation state detection unit 208 includes a photosensor 2081 and the detection flag 2082. The detection flag 2082 blocks or releases a detection surface of the photosensor 2081 in association with the rotation operation of the developer replenishment container TB.

When the user gives an instruction to perform an image forming operation, the image forming processing is executed. As a result, as illustrated in FIG. 5, the developer T in the developing device 10 adheres to the photosensitive member 1 so as to be consumed. When the CPU 201 determines that a certain amount of developer T in the developing device 10 has been consumed, the developer T is supplied from the developer storing unit 210 to the developing device 10.

When the developer is supplied to the developing device 10, as illustrated in FIG. 6, the amount of developer T in the developer storing unit 210 is reduced, and a detection level obtained by the remaining amount detection sensor 211 is reduced. The CPU 201 which has detected that the amount of developer T in the developer storing unit 210 has been reduced to be smaller than a predetermined amount from the detection result obtained by the remaining amount detection sensor 211 drives the container drive unit 207 so as to perform an operation of supplying the developer T from the developer replenishment container TB to the developer storing unit 210. In the first embodiment, when the developer replenishment container TB is rotated in a direction of an arrow "m," the developer T is supplied to the developer storing unit 210.

The operation state concerning whether the developer replenishment container TB is rotated is monitored by the operation state detection unit 208. Specifically, the CPU 201 monitors whether the photosensor 2081 is blocked or released by the detection flag 2082 within a certain time period from when the drive signal of the container drive unit 207 is transmitted. When the photosensor 2081 is not blocked or released within the certain time period, the CPU 201 determines that some type of failure has occurred in the developer replenishment operation, and stops the replenishment operation of the developer replenishment container TB.

After that, the CPU 201 notifies the user of the fact that an abnormal state has occurred and thus the image forming apparatus 100 has been stopped through display on the operation unit 205. Further, when the image forming apparatus 100 is connected to a network, the CPU 201 notifies a CE or a sales company of the fact that an abnormal state has occurred and thus the image forming apparatus 100 has been stopped via the network. The abnormality of the developer replenishment operation is mainly caused by two failure states.

The first failure state is a state in which the developer replenishment container TB is not rotated even when a drive force is received from the container drive unit 207. Such a failure mode is hereinafter referred to as "failure mode A." For example, the failure mode A occurs as follows. In some cases, the developer T in the developer replenishment container TB is consolidated due to vibrations in a distribution system. This consolidation leads to an increase of a rotation load of the developer accommodation unit 401 with respect to the held unit 402. The increase of the rotation load of the developer accommodation unit 401 causes the state of the failure mode A in which the developer accommodation unit 401 cannot be rotated with the drive force of the container drive unit 207. Further, the failure mode A occurs also in a case of a state in which the container drive unit 207 simply has a failure and thus no drive force is transmitted to the developer replenishment container TB.

In this case, the developer replenishment container TB is not rotated, and hence the detection flag 2082 cannot block or release the photosensor 2081. Thus, the operation state detection unit 208 detects an abnormality. Further, no developer T is supplied from the developer replenishment container TB to the developer storing unit 210. Accordingly, in the case of the failure mode A, the detection level obtained by the remaining amount detection sensor 211 of the developer storing unit 210 is not recovered.

The second failure state is a state in which the developer replenishment container TB is rotated by receiving the drive force from the container drive unit 207, but the operation state detection unit 208 cannot detect the operation. Such a failure mode is hereinafter referred to as "failure mode B." The failure mode B is, for example, a state in which the detection surface of the photosensor 2081 of the operation state detection unit 208 gets dirty with the developer. In this case, the blocking or the releasing of the photosensor 2081 by the detection flag 2082 is not detected. In the case of the failure mode B, as described above, the developer replenishment container TB is rotated, and hence a certain amount of developer T is supplied to the developer storing unit 210. That is, in the case of the failure mode B, the detection level obtained by the remaining amount detection sensor 211 of the developer storing unit 210 is recovered.

The recovery work of the image forming apparatus 100 is desired to be performed promptly by the CE. For example, in the case of the failure mode A, the developer replenishment container TB or the container drive unit 207 is required to be repaired, and in the case of the failure mode B, the operation state detection unit 208 of the container holding unit 301 is required to be repaired. However, in actuality, it takes some time of from several hours to several days before the maintenance work is performed in response to reception of the notification, in consideration of identification of a repair part and arrangement of a repair component.

Thus, in some cases, the user is given an instruction to perform an operation of repowering the image forming apparatus 100 so as to restart the image forming apparatus 100 and also checking whether the image forming apparatus 100 can reoperate and what kind of state the image forming apparatus 100 is brought into after the reoperation. The first object thereof is to restart the image forming apparatus 100 so as to collect information for identifying the failure part (the causal part). The second object resides in that, depending on the level or the type of the failure, in some cases, the image forming apparatus 100 can form not a small number of images through the restart, and thus the opportunity loss of the user may be able to be suppressed to the minimum.

As a specific example, when the failure mode A has occurred, the CPU 201 stops the image forming apparatus 100 under a state in which no developer T is supplied to the developer storing unit 210. When the image forming processing is started after the restart caused by the user, the CPU 201 detects that the remaining amount of developer T in the developer storing unit 210 is small, and thus drives the developer replenishment container TB so as to supply the developer T. As a result, a replenishment operation abnormality is detected similarly to that before the reoperation, and the image forming apparatus 100 is stopped. In this case, the image forming apparatus 100 cannot operate until the CE takes actions for failure repair, but the fact that the failure state easily occurs again is acquired as the in-machine data.

Meanwhile, when the failure mode B has occurred, a certain amount of developer T is supplied to the developer storing unit 210. Thus, there is a possibility that the remaining amount detection sensor 211 of the developer storing unit 210 detects that a sufficient amount of developer T is present in the developer storing unit 210. In this case, when the image forming processing is executed after the restart of the image forming apparatus 100, the operation is smoothly allowed until the certain amount of developer T is consumed. In this case, the opportunity loss of the user can be minimized, and the fact that the failure state does not easily occur again because of the reoperation is acquired as the in-machine data.

When the image forming processing is executed as described above, the developer T is consumed, and the developer T is supplied from the developer replenishment container TB. In this case, when the amount of developer T in the developer replenishment container TB becomes smaller than a predetermined amount, a sufficient amount of developer T is not supplied to the developer storing unit 210. When the amount of developer in the developer storing unit 210 does not return within a certain time period, the CPU 201 determines that the developer T of the developer replenishment container TB is used up. The case in which the amount of developer in the developer storing unit 210 does not return within a certain time period is specifically a case in which the detection level obtained by the remaining amount detection sensor 211 is not recovered even though the operation of supplying the developer T of the developer replenishment container TB is performed. After that, the CPU 201 displays this fact onto the operation unit 205 so as to notify the user or the CE of this fact. The user or the CE replaces the developer replenishment container TB in accordance with the notification.

Figure 7A:
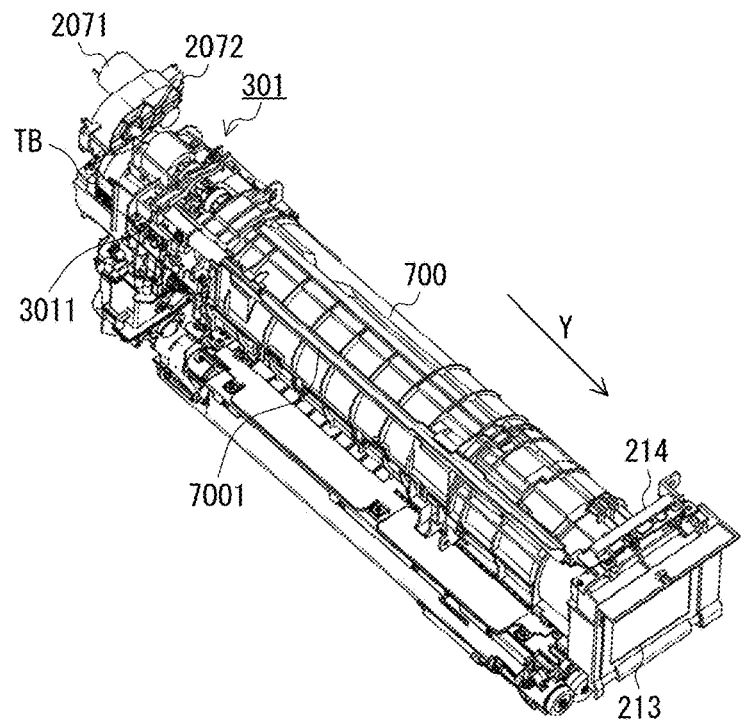
FIG. 7A, FIG. 7B, and FIG. 7C are views for illustrating a state in which the developer replenishment container is unremovable.
Figure 7B:
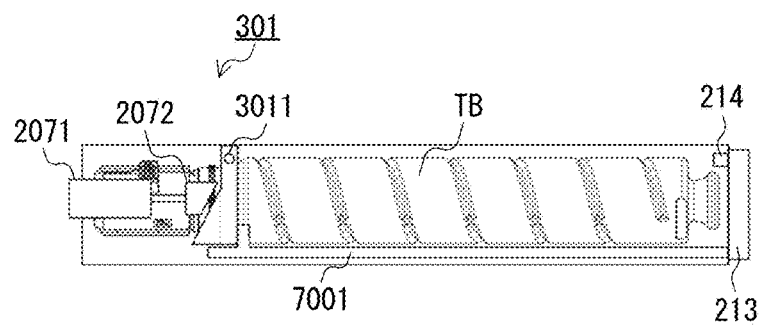
Figure 7C:
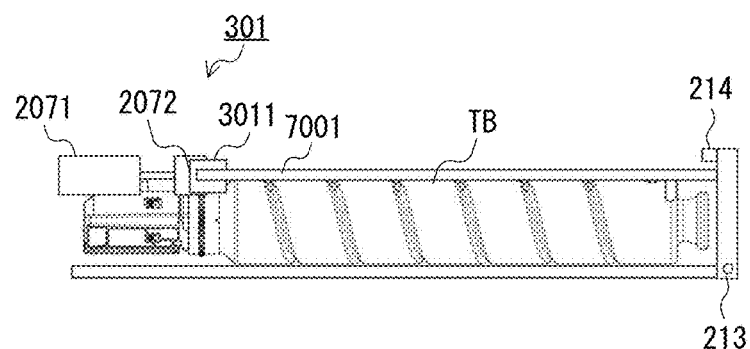
Figure 8A:
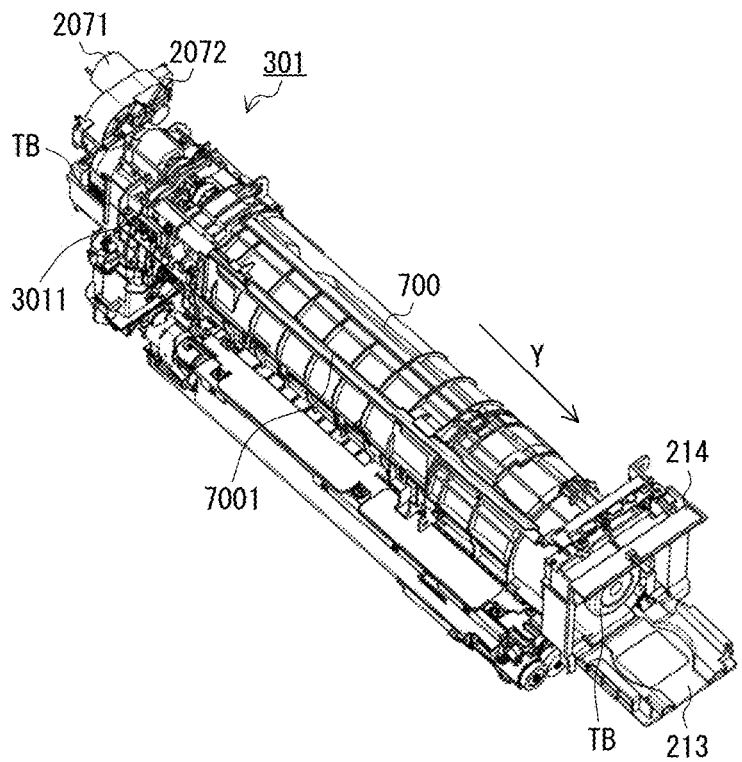
FIG. 8A, FIG. 8B, and FIG. 8C are views for illustrating a state in which the developer replenishment container is removable.
Figure 8B:
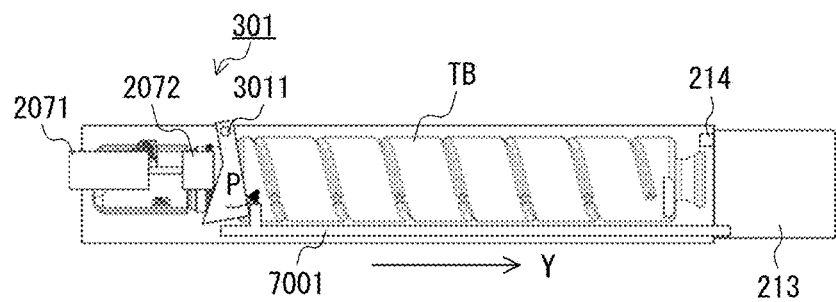
Figure 8C:
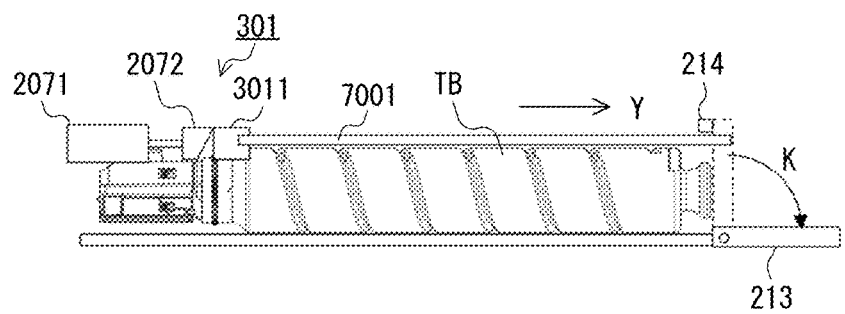

The operation of replacing the developer replenishment container TB is described with reference to FIG. 7A to FIG. 7C and FIG. 8A to FIG. 8C. FIG. 7A to FIG. 7C are views for illustrating a state in which the developer replenishment container TB is mounted to the image forming apparatus 100 in an unremovable manner. FIG. 8A to FIG. 8C are views for illustrating a state in which the developer replenishment container TB is removable from the image forming apparatus 100. FIG. 7A and FIG. 8A are perspective views. FIG. 7B and FIG. 8B are top views. FIG. 7C and FIG. 8C are side views. For the sake of convenience in description, FIG. 7B, FIG. 7C, FIG. 8B, and FIG. 8C show simplified configurations.

As illustrated in FIG. 7A, under a state in which the image forming apparatus 100 is in operation, the developer replenishment container TB is incorporated in a container housing 700. Access to the developer replenishment container TB from the outside is disabled by the container replacement door 213 provided to the container housing 700.

As illustrated in FIG. 7B, the container replacement door 213 is coupled to the drive transmission portion 2072 of the container drive unit 207 via a link shaft 7001 and a link member 3011. The link shaft 7001 extends along the container housing 700. The link member 3011 is provided in the container holding unit 301. Further, the container housing 700 has the open/close detection sensor 214 provided so as to detect the opening or closing of the container replacement door 213.

When the developer replenishment container TB gets empty, the operation of replacing the developer replenishment container TB is performed by the user or the CE. At this time, in response to pressing of the replacement button of the developer replenishment container TB displayed on the operation unit 205, the drive motor 2071 and the drive transmission portion 2072 of the container drive unit 207 rotate in a direction reverse to that at the time of the operation of replenishing the developer T of the developer replenishment container TB (rotation in a direction opposite to that of an arrow "n" of FIG. 6). A clutch (not shown) is provided in a part of the drive transmission portion 2072 so that the clutch prevents the drive force from being transmitted to the developer replenishment container TB at the time of the reverse rotation.

As illustrated in FIG. 8B, the reverse rotation of the drive transmission portion 2072 causes a part of the drive transmission portion 2072 to be brought into abutment against the link member 3011, and thus the link member 3011 turns in a direction of an arrow P. Next, along with the operation of the link member 3011, the link shaft 7001 is displaced in a direction of an arrow Y. Along with the displacement of the link shaft 7001, the container replacement door 213 is opened in a direction of an arrow K of FIG. 8C. As illustrated in FIG. 8A, when the container replacement door 213 is opened, the user or the CE can remove the developer replenishment container TB in the Y direction so as to replace this developer replenishment container TB with a new developer replenishment container.

In the operation of replacing the developer replenishment container TB, the open/close detection sensor 214 monitors a state concerning whether the container replacement door 213 is correctly opened. When the CPU 201 detects an abnormality of the open/close detection sensor 214, the CPU 201 determines that an abnormality has occurred in the operation of replacing the developer replenishment container TB due to some kind of failure, and thus stops the image forming apparatus 100. The abnormality of the open/close detection sensor 214 is detected when, for example, the detection state of the open/close detection sensor 214 has not changed within a certain time period regardless of the pressing of the replacement button. After that, the CPU 201 displays the fact that the abnormal state has occurred and thus the image forming apparatus 100 has been stopped on the operation unit 205 so as to notify the user of this fact. Further, when the image forming apparatus 100 is connected to a network, the CPU 201 notifies the CE or the sales company of the fact that an abnormal state has occurred and thus the image forming apparatus 100 has been stopped via the network.

The abnormality of the operation of replacing the developer replenishment container TB is mainly caused by the following three failure states.

The third failure state is a failure of the container drive unit 207. Such a failure is hereinafter referred to as "failure mode C." Specifically, for example, the failure mode C occurs when the drive motor 2071 does not operate or when the drive transmission portion 2072 becomes a load to prevent the drive force from being transmitted. In this case, no drive force is transmitted to the link member 3011 and the link shaft 7001, and hence the container replacement door 213 is not opened.

The fourth failure state is a failure of the link member 3011 itself or the link shaft 7001 itself which has received the drive force from the container drive unit 207. Such a failure is hereinafter referred to as "failure mode D." Specifically, the failure mode D occurs when the link member 3011 and the link shaft 7001 are brought to a non-coupling state due to bad assembly, an impact in a distribution system, or the like. In this case, similarly to the failure mode C, no drive force is transmitted to the link shaft 7001, and hence the container replacement door 213 is not opened.

The fifth failure state is a failure of the open/close detection sensor 214. Such a failure is hereinafter referred to as "failure mode E." In the case of the failure mode E, the container replacement door 213 is opened by the drive force of the container drive unit 207, but this open state is not detected.

As described above, the recovery work of the stopped image forming apparatus 100 is desired to be performed promptly by the CE. For example, in the case of the failure mode C, the container drive unit 207 is required to be repaired, and in the case of the failure mode D, the link shaft 7001 or the link member 3011 of the container holding unit 301 is required to be repaired. In the case of the failure mode E, the open/close detection sensor 214 is required to be repaired. However, in actuality, it takes some time of from several hours to several days before the maintenance work is performed in response to reception of the notification, in consideration of identification of a repair part and arrangement of a repair component. Thus, as described above, in some cases, the user is given an instruction to perform an operation of repowering the image forming apparatus 100 so as to restart the image forming apparatus 100 and also checking whether the image forming apparatus 100 can reoperate and what kind of state the image forming apparatus 100 is brought into after the reoperation.

For example, in a case in which the abnormality of the replacement operation is the failure mode C or the failure mode D, when the image forming apparatus 100 reoperates, a notification of urging the user to replace the developer replenishment container TB is output again. At this time, when the operation unit 205 is operated as in the same way as the previous time, the state has no change, and hence it is highly possible that a similar operation abnormality immediately occurs. When the operation abnormality has occurred, the user or the CE is notified of this fact again. In other words, with the immediate reoccurrence of the operation abnormality, the CE can assume that the operation abnormality of this time is an abnormality of the drive transmission portion 2072, which is a cause of the failure mode C, or an abnormality of the link member 3011 or the link shaft 7001, which is a cause of the failure mode D.

If the failure mode E has occurred, the image forming apparatus 100 has been stopped, but the container replacement door 213 is opened. Thus, there is a possibility that the developer replenishment container TB has been replaced. In this case, when the image forming apparatus 100 is reoperated, the CPU 201 detects that the developer replenishment container TB has been replaced, and hence the notification of urging the user to replace the developer replenishment container TB is not given. That is, it is highly possible that the image forming apparatus 100 operates as usual, and a similar operation abnormality occurs again when the replaced developer replenishment container TB gets empty. The CE can determine that, because the operation abnormality does not immediately occur again, it is highly possible that the cause of the operation abnormality of the previous time is a failure of the open/close detection sensor 214, which is a cause of the failure mode E.

<Error Code>

FIG. 9 is an explanatory table of error codes. FIG. 9 shows an error code to be displayed on the operation unit 205 when the CPU 201 detects an error, detection contents thereof, an occurring phenomenon, a failure mode, a failure part (a causal part), and an operation period until reoccurrence of the error at the time of reoperation. With reference to FIG. 9, a relationship between each error and failure contents and a period until reoccurrence of the error at the time of reoperation are described.

An error of an error code Err001 is an error to be issued when, even though the container drive unit 207 is driven, the operation of the developer replenishment container TB cannot be detected by the operation state detection unit 208. As described above, when the operation state detection unit 208 cannot detect the operation of the developer replenishment container TB even though the developer replenishment container TB is driven, any of the failure mode A and the failure mode B has occurred. In the case of the failure mode A, the developer replenishment container TB or the container drive unit 207 has a failure, and in the case of the failure mode B, the operation state detection unit 208 has a failure. In any of the failure modes, the CPU 201 cannot detect the operation of the developer replenishment container TB, and hence the same error code Err001 is issued.

In the failure mode A, the developer replenishment container TB does not operate, and thus no developer T is supplied to the developer storing unit 210. Thus, when the image forming apparatus 100 is restarted and reoperated after the occurrence of the error, the remaining amount detection sensor 211 detects the reduction of the amount of developer T in the developer storing unit 210, and the CPU 201 executes a developer supplying operation. Accordingly, the error of the error code Err001 occurs again within a short operation period, specifically, at the number of printed sheets of 10 sheets or less. A threshold value of the number of printed sheets of 10 sheets is a value until reoccurrence of the error of the error code Err001, which is calculated based on an operation period of the image forming apparatus 100 until the error determination is made.

In the failure mode B, the operation state detection unit 208 cannot detect the operation state of the developer replenishment container TB, but the developer replenishment container TB operates, and hence the developer is supplied to the developer storing unit 210. Thus, even when the image forming apparatus 100 is restarted and reoperated after the occurrence of the error, the CPU 201 does not execute the developer supplying operation until the developer T in the developer storing unit 210 is consumed by the image forming operation and the remaining amount detection sensor 211 detects the reduction of the developer amount. Accordingly, the error of the error code Err001 occurs again after an operation period longer than that of the failure mode A, specifically, at the number of printed sheets of more than 10 sheets.

An error of an error code Err002 is an error to be issued when, even though the container drive unit 207 is driven to rotate in the reverse direction, the open state of the container replacement door 213 cannot be detected by the open/close detection sensor 214. As described above, in this case, any of the failure mode C, the failure mode D, and the failure mode E has occurred. When the failure mode C or the failure mode D has occurred, any of the container drive unit 207, the link member 3011, and the link shaft 7001 has a failure. When the failure mode E has occurred, the open/close detection sensor 214 has a failure. In any of the failures, the CPU 201 cannot detect the open state of the container replacement door 213, and hence the CPU 201 issues the same error code Err002.

In the failure mode C or the failure mode D, the container replacement door 213 is not opened, and hence the developer replenishment container TB is not replaced and remains empty. Accordingly, when the image forming apparatus 100 is restarted and reoperated after the occurrence of the error, the CPU 201 drives the container drive unit 207 again so as to open the container replacement door 213. However, the open state of the container replacement door 213 cannot be detected, and hence the error of the error code Err002 occurs again. The error of the error code Err002 occurs again within a short operation period, specifically, at the number of printed sheets of 10 sheets or less. A threshold value of the number of printed sheets of 10 sheets is a value until reoccurrence of the error of the error code Err002, which is calculated based on an operation period of the image forming apparatus 100 until the error determination is made.

In the failure mode E, the open/close detection sensor 214 cannot detect the open state, but the container replacement door 213 is opened, and hence the work of replacing the developer replenishment container TB can be performed. When the developer replenishment container TB is replaced, the container replacement door 213 is not opened again until the timing at which the replaced developer replenishment container TB gets empty. Accordingly, the error of the error code Err002 occurs again after an operation period longer than those of the failure modes C and D, specifically, at the number of printed sheets of more than 10 sheets.

<Error-Related Information>

FIG. 10 is an exemplary table of error-related information accumulated in the in-machine data accumulation memory 204. The error-related information includes the date and time at which the error has occurred, the count value indicating the operation state of the image forming apparatus 100, and the error code assigned in advance in accordance with the type of the error. In the first embodiment, the count value is the cumulative number of printed sheets of the image forming apparatus 100. The error-related information functions as history information on a plurality of errors caused (detected) in the past.

Every time the CPU 201 detects an error, the CPU 201 accumulates the error-related information exemplified in FIG. 10 into the in-machine data accumulation memory 204 in a form of adding one row. For example, the error-related information in the first row of FIG. 10 indicates that, at 2022/6/1 12:00, the error of the error code Err001 has occurred in the operation state of the cumulative number of printed sheets of 100,010 sheets. In failure deduction described later, the CPU 201 refers to this error-related information so as to deduce the failure part from the cumulative number of printed sheets and the error code.

<Failure Deduction>

In the failure deduction, the failure patterns are classified into a plurality of patterns (in this case, three patterns), and determination on which failure pattern the occurrence state of the error is applied to is made. The failure part is deduced in accordance with the determined failure pattern. FIG. 11A to FIG. 11D are explanatory diagrams of the failure patterns. The horizontal axis of each of FIG. 11A to FIG. 11D indicates the count value of the image forming apparatus 100. The triangular mark indicates the timing at which an error has occurred. The white triangular mark indicates an error to be analyzed in the failure deduction. The black triangular mark indicates an error which has occurred in the past before the error to be analyzed.

In the failure deduction, one predetermined error is paid attention as an error to be analyzed. The failure deduction is performed through use of the error code and the count value of the error to be analyzed and the error code and the count value of a related error related to the error to be analyzed. The related error refers to an error that may occur by a failure part similar to a failure part at which the error to be analyzed may occur, and is also an error which has occurred in the past before the error to be analyzed.

For example, in the case of the error of the error code Err001, any of the developer replenishment container TB or the container drive unit 207 and the operation state detection unit 208 is the failure part, and hence the error of the error code Err002 having the container drive unit 207 as the failure part may become the related error. Further, also when the error of the error code Err001 has occurred in the past, this error is defined as the related error.

The failure deduction is performed based on a difference between the count value at the time of occurrence of the related error in the past and the count value at the time of reoccurrence of the error to be analyzed after the image forming apparatus 100 is restarted and reoperated. This difference in the count value is referred to as "operation period." It is determined whether or not the operation period falls within a predetermined range, and the failure part is deduced based on a determination result. The predetermined range is represented by a threshold value. With reference to a result of comparison between this threshold value and the operation period (difference), the failure part whose failure pattern has been determined is deduced.

Figure 11A:
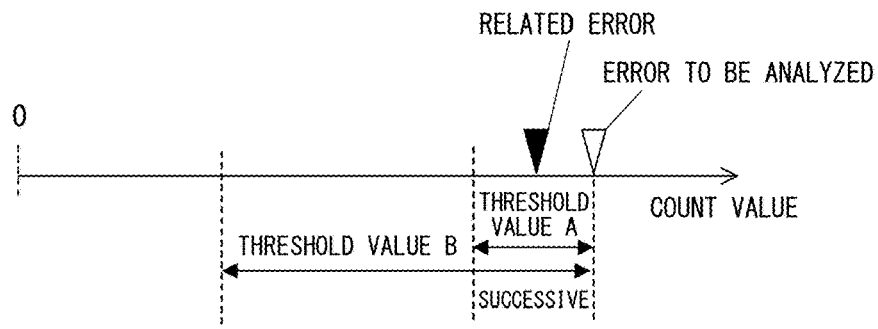
FIG. 11A, FIG. 11B, FIG. 11C, and FIG. 11D are explanatory diagrams of failure patterns.

FIG. 11A shows such a failure state that the operation period between the error to be analyzed and the related error is short and an error occurs immediately after the reoperation. Errors successively occur, and thus such a failure pattern is defined as "successive." The CPU 201 determines whether a related error occurs within a range of a threshold value A of the operation period and further whether no related error occurs within a range of a threshold value B which is a period longer than the threshold value A. When a related error occurs within the range of the threshold value A but no related error occurs within the range of the threshold value B, the CPU 201 determines that the failure pattern is "successive." The threshold value A is a value which is set in advance in order to determine that the failure pattern is "successive," and is stored in the ROM 202. The threshold value A may be determined by calculating a value that has a high statistical probability, based on data obtained by associating a large number of pieces of error occurrence information and failure parts with each other.

Figure 11B:
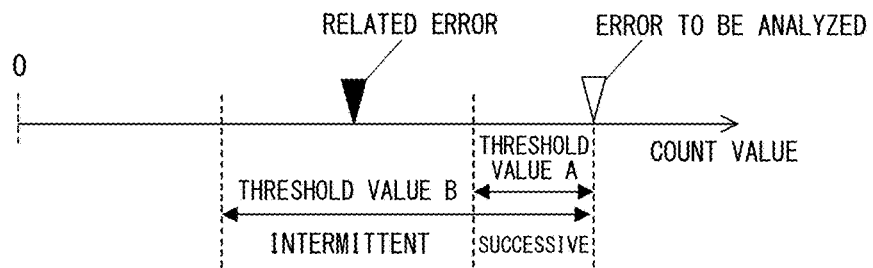

FIG. 11B shows a failure state in which the operation period between the error to be analyzed and the related error is longer than that of the failure pattern of "successive." Errors occur at an interval, and hence such a failure pattern is defined as "intermittent." The CPU 201 determines whether the related error has occurred within a range of more than the threshold value A and equal to or less than the threshold value B. When the related error is present within the range of more than the threshold value A and equal to or less than the threshold value B, the CPU 201 determines that the failure pattern is "intermittent." The threshold value B is a value which is set in advance in order to determine that the failure pattern is "intermittent," and is stored in the ROM 202. The threshold value B is a period longer than the threshold value A. The threshold value B may be determined by calculating a value that has a high statistical probability, based on data obtained by associating a large number of pieces of error occurrence information and failure parts with each other.

Figure 11C:
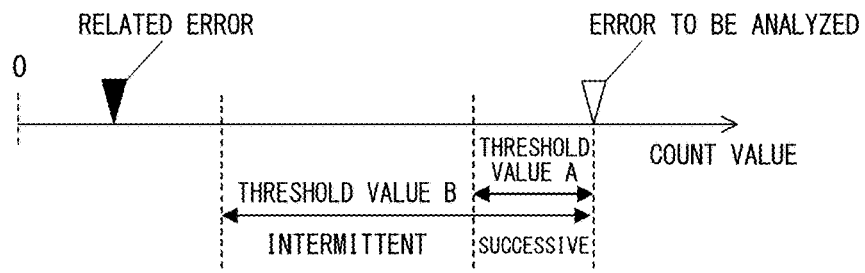

FIG. 11C shows a state in which the operation period between the error to be analyzed and the related error is further longer than that of the failure pattern of "intermittent." The CPU 201 determines whether the related error has occurred within the range of the threshold value A and within the range of the threshold value B. When no related error has occurred in any of those ranges, the CPU 201 determines that there is a low possibility that the predetermined failure state is continued for a long time because a period with stable operation is long. Thus, the CPU 201 determines that the error to be analyzed and the related error have been caused not by the same failure cause, but by failure causes independent of each other.

The CPU 201 defines such a failure pattern as "no occurrence" because no related error has occurred. In this case, there is no information for performing the failure deduction, and hence the failure deduction cannot be performed based on the count value. The CPU 201 determines that the related error is absent within the range of the threshold value A and the related error is absent within the range of more than the threshold value A and equal to or less than the threshold value B, to thereby determine that the failure pattern is "no occurrence."

Figure 11D:
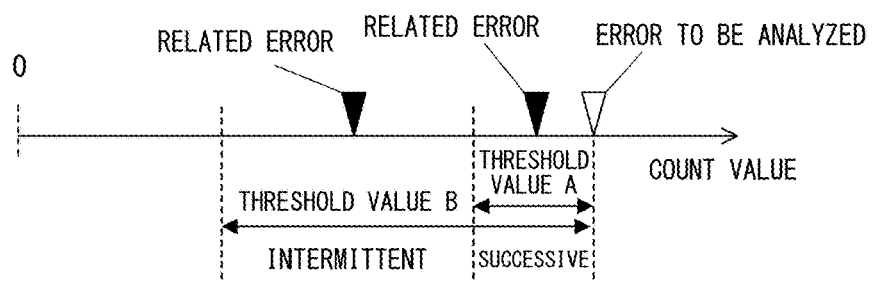

FIG. 11D shows a state in which the related errors have occurred within both of the range of the threshold value A and the range of more than the threshold value A and equal to or less than the threshold value B. In such a case, the failure deduction is disabled. Such a failure pattern is defined as "no occurrence" as in the same way as in FIG. 11C. The processing of the CPU 201 is similar to that of FIG. 11C. The CPU 201 determines that the related errors are present within both of the range of the threshold value A and the range of more than the threshold value A and equal to or less than the threshold value B, to thereby determine that the failure pattern is "no occurrence." Even when the related error does not occur at all, the CPU 201 determines that the failure pattern is "no occurrence." That is, the CPU 201 determines that the failure pattern is "no occurrence" when the related error is absent within both of the range of the threshold value A and the range of more than the threshold value A and equal to or less than the threshold value B.

FIG. 12 is an exemplary diagram of a failure deduction table. The failure deduction table of FIG. 12 is failure deduction information obtained by organizing, for each combination of the error code of the error to be analyzed and the error code of the related error, information indicating a relationship among a determination condition based on the threshold value A and the threshold value B, a failure pattern, and a failure part that has a possibility of becoming an error cause. The CPU 201 performs the failure deduction based on the failure deduction table. The failure deduction table is stored in the ROM 202, and is read out at the time of execution of the failure deduction. Details of the failure deduction table are described.

"No. 1" corresponds to a case in which the error-to-be-analyzed code is "Err001" and the related-error code is "Err001," and further the failure pattern is "successive." This case corresponds to the failure mode A of FIG. 9. The threshold value A for determining whether the failure pattern is "successive" or "intermittent" is 10 sheets. The CPU 201 determines that the failure state corresponds to "No. 1" when an error of the related-error code Err001 has occurred within a range of 10 sheets or less, through use of a time of occurrence of an error of the error-to-be-analyzed code Err001 as a reference. In this case, the CPU 201 deduces that the failure part is any of the developer replenishment container TB or the container drive unit 207.

"No. 2" corresponds to a case in which the error-to-be-analyzed code is "Err001" and the related-error code is "Err001," and further the failure pattern is "intermittent." This case corresponds to the failure mode B of FIG. 9. The threshold value B for determining whether the failure pattern is "intermittent" or "no occurrence" is 1,000 sheets. The CPU 201 determines that the failure state corresponds to "No. 2" when an error of the related-error code Err001 has occurred within a range of more than 10 sheets and equal to or less than 1,000 sheets, through use of a time of occurrence of an error of the error-to-be-analyzed code Err001 as a reference. In this case, the CPU 201 deduces that the failure part is the operation state detection unit 208.

"No. 3" corresponds to a case in which the error-to-be-analyzed code is "Err001" and the related-error code is "Err001," and further the failure pattern is "no occurrence." The CPU 201 determines that the failure state corresponds to "No. 3" when an error of the related-error code Err001 has not occurred within a range of 1,000 sheets or less, through use of a time of occurrence of an error of the error-to-be-analyzed code Err001 as a reference. A case in which a difference in the number of printed sheets between the error-to-be-analyzed code Err001 and the related-error code Err001 exceeds 1,000 sheets also corresponds to the same case. In this case, there is no information for performing the failure deduction, and hence the CPU 201 deduces that the failure part is any of all parts related to the error-to-be-analyzed code Err001 (all parts that may be a cause of the error-to-be-analyzed code Err001). Any of all parts related to the error code Err001 is any of the developer replenishment container TB, the container drive unit 207, and the operation state detection unit 208.

"No. 4" corresponds to a case in which the error-to-be-analyzed code is "Err002" and the related-error code is "Err001," and further the failure pattern is "successive." When both of the error of the error code Err002 and the error of the error code Err001 have occurred, with reference to FIG. 9, a failure part that may be a cause of a failure in common is only the container drive unit 207. Thus, the CPU 201 deduces that the failure part is the container drive unit 207 regardless of the count value. The threshold value A for determining whether the failure pattern is "successive" or "intermittent" is 10 sheets. The CPU 201 determines that the failure state corresponds to "No. 4" when an error of the related-error code Err001 has occurred within a range of 10 sheets or less, through use of a time of occurrence of an error of the error-to-be-analyzed code Err002 as a reference. In this case, the CPU 201 deduces that the failure part is the container drive unit 207.

"No. 5" corresponds to a case in which the error-to-be-analyzed code is "Err002" and the related-error code is "Err001," and further the failure pattern is "intermittent." In this case, similarly to "No. 4," both of the error of the error code Err002 and the error of the error code Err001 have occurred, and hence the failure part and the processing of the CPU 201 are equivalent to those of "No. 4." "No. 4" and "No. 5" may be unified into one case with the determination condition being set as 1,000 sheets or less.

As an example of a case in which the error of the error code Err001 has occurred in the past and, after that, the error of the error code Err002 occurs, the following case can be considered. For example, after the error of the error code Err001 has occurred due to the failure of the container drive unit 207, in order to check the state of the developer replenishment container TB, the CE operates the operation unit 205 so as to forcibly open the container replacement door 213. Even though the container replacement door 213 is attempted to be opened, the container drive unit 207 has a failure, and hence the error of the error code Err002 occurs.

"No. 6" corresponds to a case in which the error-to-be-analyzed code is "Err002" and the related-error code is "Err001," and further the failure pattern is "no occurrence." The CPU 201 determines that the failure state corresponds to "No. 6" when an error of the related-error code Err001 has not occurred within a range of 1,000 sheets or less, through use of a time of occurrence of an error of the error-to-be-analyzed code Err002 as a reference. A case in which the difference in the number of printed sheets between the error-to-be-analyzed code Err002 and the related-error code Err001 exceeds 1,000 sheets also corresponds to the same case. In this case, there is no information for performing the failure deduction, and hence the CPU 201 deduces that the failure part is any of all parts related to the error-to-be-analyzed code Err002 (all parts that may be a cause of the error-to-be-analyzed code Err002). Any of all parts related to the error-to-be-analyzed code Err002 is any of the container drive unit 207, the link member 3011, the link shaft 7001, and the open/close detection sensor 214.

"No. 7" corresponds to a case in which the error-to-be-analyzed code is "Err002" and the related-error code is "Err002," and further the failure pattern is "successive." This case corresponds to the failure modes C and D of FIG. 9. The threshold value A for determining whether the failure pattern is "successive" or "intermittent" is 10 sheets. The CPU 201 determines that the failure state corresponds to "No. 7" when an error of the related-error code Err002 has occurred within a range of 10 sheets or less, through use of a time of occurrence of an error of the error-to-be-analyzed code Err002 as a reference. In this case, the CPU 201 deduces that the failure part is any of the container drive unit 207, the link member 3011, and the link shaft 7001.

"No. 8" corresponds to a case in which the error-to-be-analyzed code is "Err002" and the related-error code is "Err002," and further the failure pattern is "intermittent." This case corresponds to the failure mode E of FIG. 9. The threshold value B for determining whether the failure pattern is "intermittent" or "no occurrence" is 1,000 sheets. The CPU 201 determines that the failure state corresponds to "No. 8" when an error of the related-error code Err002 has occurred within a range of more than 10 sheets and equal to less than 1,000 sheets, through use of a time of occurrence of an error of the error-to-be-analyzed code Err002 as a reference. In this case, the CPU 201 deduces that the failure part is the open/close detection sensor 214.

"No. 9" corresponds to a case in which the error-to-be-analyzed code is "Err002" and the related-error code is "Err002," and further the failure pattern is "no occurrence." The CPU 201 determines that the failure state corresponds to "No. 9" when an error of the related-error code Err002 has not occurred within a range of 1,000 sheets or less, through use of a time of occurrence of an error of the error-to-be-analyzed code Err002 as a reference. A case in which a difference in the number of printed sheets between the error-to-be-analyzed code Err002 and the related-error code Err002 exceeds 1,000 sheets also corresponds to the same case. In this case, there is no information for performing the failure deduction, and hence the CPU 201 deduces that the failure part is any of all parts related to the error-to-be-analyzed code Err002 (all parts that may be a cause of the error-to-be-analyzed code Err002). Any of all parts related to the error-to-be-analyzed code Err002 is any of the container drive unit 207, the link member 3011, the link shaft 7001, and the open/close detection sensor 214.

Figure 13:
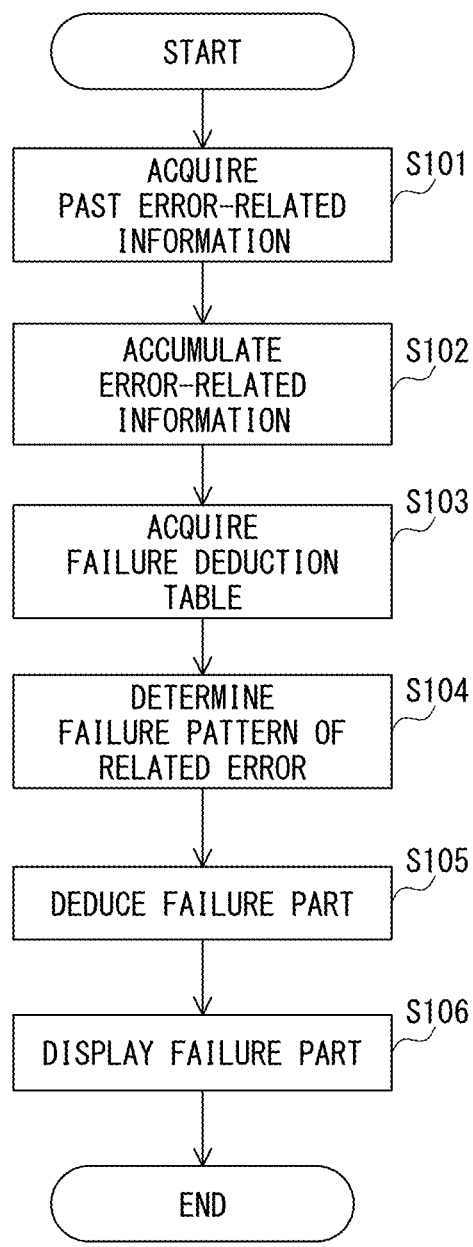
FIG. 13 is a flow chart for illustrating processing of accumulating the error-related information and processing of deducing a failure part (a causal part).

FIG. 13 is a flow chart for illustrating processing of accumulating the error-related information and processing of deducing the failure part. This series of steps of processing are executed when an error has occurred in the image forming apparatus 100. The CPU 201 determines the detected error as the error to be analyzed.

The CPU 201 acquires the error-related information on an error which has occurred in the past from the in-machine data accumulation memory 204 (Step S101). The CPU 201 accumulates the error-related information on an error which has newly occurred into the in-machine data accumulation memory 204 (Step S102). The CPU 201 acquires the failure deduction table from the ROM 202 (Step S103). The in-machine data accumulation memory 204 functions as a database having stored therein information on errors which have occurred in the image forming apparatus 100.

The CPU 201 determines the failure pattern of the related error based on the past error-related information (Step S104). This determination is made for each related error. For example, when the error-to-be-analyzed code is "Err002," the CPU 201 determines that, based on the failure deduction table, two types of related-error codes corresponding to "Err002," specifically, "Err001" and "Err002" are present, and makes determination on the failure pattern. Details of the method of determining the failure pattern are described later.

The CPU 201 deduces the failure part from the error code and the failure pattern, based on the failure deduction table (Step S105). For example, when the error-to-be-analyzed code is "Err001," the related-error code is "Err001," and the failure pattern is "successive," the CPU 201 deduces that the failure part is any of the developer replenishment container TB and the container drive unit 207. When a plurality of types of related errors have occurred and the failure state corresponds to a plurality of failure patterns, the CPU 201 combines the failure parts deduced for the respective failure patterns as a deduction result. For example, it is assumed that the error-to-be-analyzed code is "Err002," and both of a determination result in which the related-error code is "Err001" and the failure pattern is "successive" and a determination result in which the related-error code is "Err002" and the failure pattern is "intermittent" are obtained. In this case, the CPU 201 deduces that any of the container drive unit 207 and the open/close detection sensor 214, which are the failure parts of the respective cases, is the failure part.

The CPU 201 displays, onto the operation unit 205, information on the failure part, based on the deduction result obtained by the failure deduction processing (Step S106). After the display, the CPU 201 ends the series of steps of processing. Not only the failure part but also maintenance-related information may be additionally displayed on the operation unit 205. The maintenance-related information is, for example, a component replacement procedure or a rough work time period required for maintenance. For example, the maintenance-related information corresponding to the failure part is stored in advance in the ROM 202. The CPU 201 reads out the corresponding maintenance-related information from the ROM 202 after the failure deduction, and displays the maintenance-related information onto the operation unit 205. Further, when the image forming apparatus 100 is connected to a network, the CPU 201 notifies the CE of the failure part and the maintenance-related information via the network.

Figure 14:
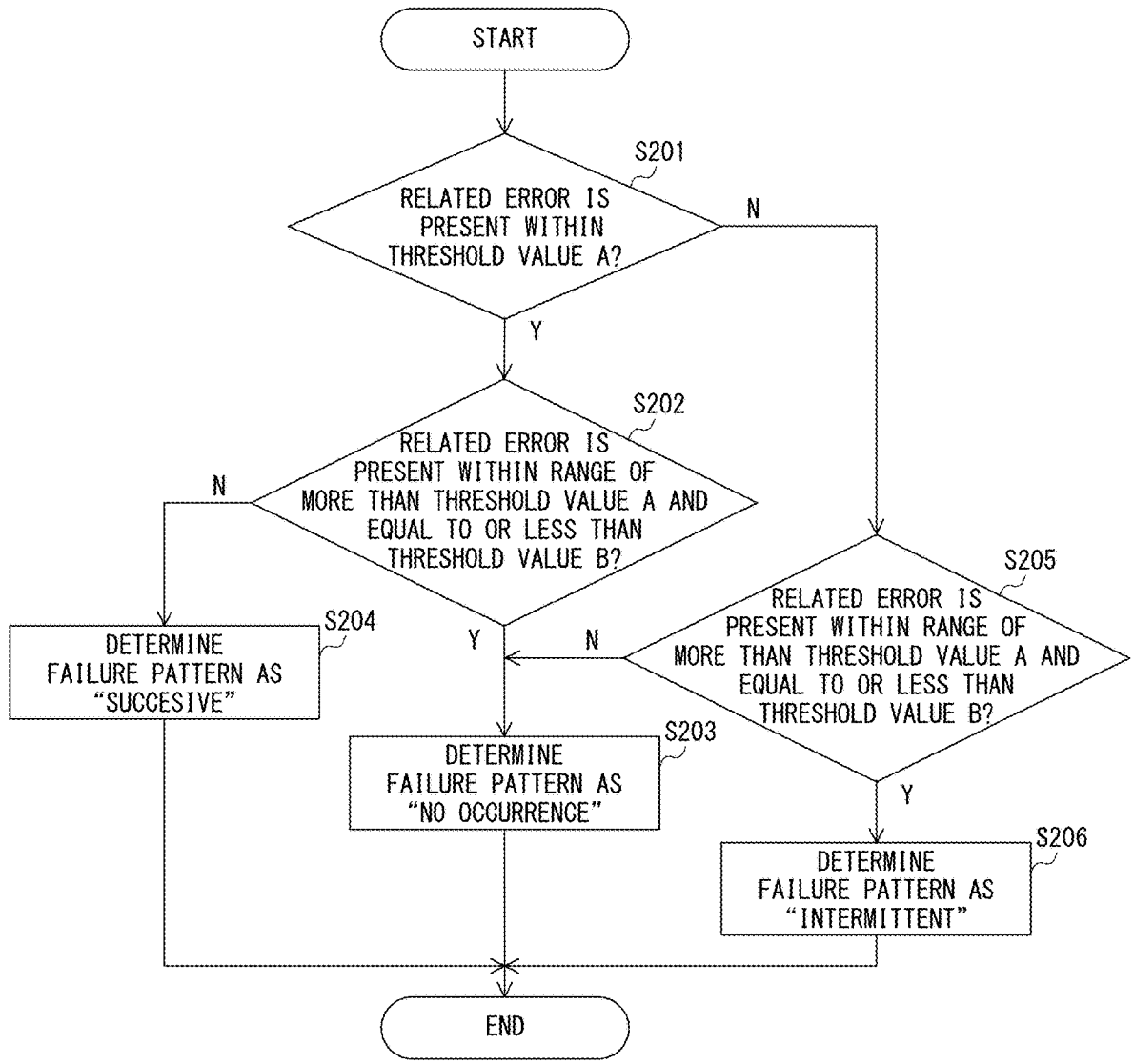
FIG. 14 is a flow chart for illustrating processing of determining the failure pattern.

FIG. 14 is a flow chart for illustrating the processing of determining the failure pattern of Step S104.

The CPU 201 calculates the difference in the count value between the error to be analyzed and the related error, and determines whether the calculated difference falls within the range of the threshold value A (Step S201). The threshold value A is, as described above, the number of printed sheets of 10 sheets in the first embodiment. For example, when the cumulative number of printed sheets of the error to be analyzed is 100,000 sheets and the cumulative number of printed sheets of the related error is 99,999 sheets, the difference is one sheet. The CPU 201 determines whether this difference is a value equal to or less than 10 sheets corresponding to the threshold value A.

When the difference falls within the range of the threshold value A (Step S201: Y), the CPU 201 determines that the related error is present within the range of the threshold value A. In this case, the CPU 201 determines whether the difference in the count value falls within a range of more than the threshold value A and equal to or less than the threshold value B (Step S202). The threshold value B is, as described above, the number of printed sheets of 1,000 sheets in the first embodiment.

When the difference falls within the range of more than the threshold value A and equal to or less than the threshold value B (Step S202: Y), the CPU 201 determines that the related error is present within the range of more than the threshold value A and equal to or less than the threshold value B. In this case, the CPU 201 determines that the failure pattern is "no occurrence" (Step S203), and ends the processing of determining the failure pattern. This case corresponds to the pattern of FIG. 11D.

When the difference is outside of the range of more than the threshold value A and equal to or less than the threshold value B (Step S202: N), the CPU 201 determines that the related error is absent within the range of more than the threshold value A and equal to or less than the threshold value B. In this case, the CPU 201 determines that the failure pattern is "successive" (Step S204), and ends the processing of determining the failure pattern. This case corresponds to the pattern of FIG. 11A.

When the difference is outside of the range of the threshold value A (Step S201: N), the CPU 201 determines that the related error is absent within the range of the threshold value A. In this case, the CPU 201 determines whether the difference in the count value falls within the range of more than the threshold value A and equal to or less than the threshold value B (Step S205).

When the difference falls within the range of more than the threshold value A and equal to or less than the threshold value B (Step S205: Y), the CPU 201 determines that the related error is present within the range of more than the threshold value A and equal to or less than the threshold value B. In this case, the CPU 201 determines that the failure pattern is "intermittent" (Step S206), and ends the processing of determining the failure pattern. This case corresponds to the pattern of FIG. 11B.

When the difference is outside of the range of more than the threshold value A and equal to or less than the threshold value B (Step S205: N), the CPU 201 determines that the related error is absent within the range of more than the threshold value A and equal to or less than the threshold value B. In this case, the CPU 201 determines that the failure pattern is "no occurrence" (Step S203), and ends the processing of determining the failure pattern. This case corresponds to the pattern of FIG. 11C.

In the processing of deducing the failure part as described above, the CPU 201 determines the newest error as the error to be analyzed. However, the CPU 201 may be configured to select the error to be analyzed from among errors detected in the past. For example, the CPU 201 is configured to display pieces of information on the errors that have occurred until now on the display so as to allow the CE to select the error to be analyzed from among the displayed errors through use of the operation unit 205. The CPU 201 acquires the information indicating a selection result input through the operation unit 205, and determines the error to be analyzed from this information.

Second Embodiment

A configuration of an image forming apparatus 100 and a configuration of a controller 200 in a second embodiment of the present disclosure are similar to those in the first embodiment, and hence description thereof is omitted. In the second embodiment, description is given of failure deduction in a case in which a plurality of failure patterns are caused by a plurality of related errors with respect to the error to be analyzed.

FIG. 15A to FIG. 15D and FIG. 16A to FIG. 16C are explanatory diagrams of failure patterns in the second embodiment. The horizontal axis of each of FIG. 15A to FIG. 15D and FIG. 16A to FIG. 16C indicates, similarly to FIG. 11A to FIG. 11D, the count value of the image forming apparatus 100. The triangular mark indicates the timing at which the error has occurred. The white triangular mark indicates an error to be analyzed in the failure deduction. The black triangular mark indicates an error which has occurred in the past before the error to be analyzed. FIG. 17 is a flow chart for illustrating the processing of deducing the failure part in Step S105 of FIG. 13. In this case, the error to be analyzed is an error of the error code Err002 (see FIG. 9). Among the plurality of related errors, the first related error is an error of the error code Err001. Among the plurality of related errors, the second related error is an error of the error code Err002.

Figure 15A:
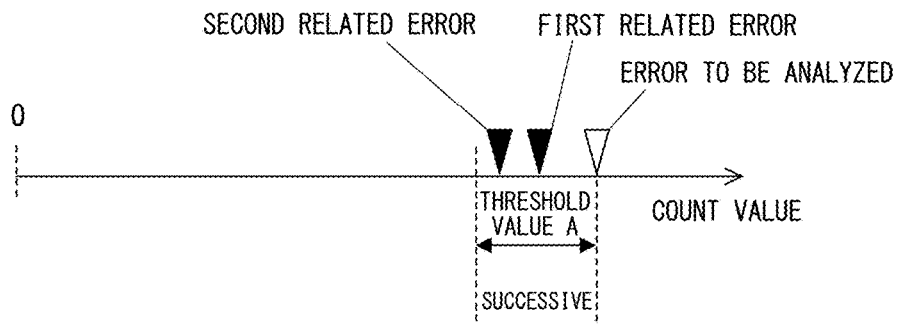
FIG. 15A, FIG. 15B, FIG. 15C, and FIG. 15D are explanatory diagrams of failure patterns.

The failure pattern illustrated in FIG. 15A shows such a failure state that the operation period between the error to be analyzed and each of the first related error and the second related error is short, and an error occurs immediately after the reoperation. In this case, the CPU 201 performs the processing steps of Step S101 to Step S105 of the flow chart of FIG. 13 so as to deduce the failure part based on the failure patterns of "No. 4" and "No. 7" in the failure deduction table of FIG. 12. Specifically, "No. 4" corresponds to a case in which the error code of the error to be analyzed is Err002 and the error code of the related error is Err001, and further the failure pattern is "successive." In this case, the CPU 201 deduces that the failure part is the container drive unit 207. "No. 7" corresponds to a case in which the error code of the error to be analyzed is Err002 and the error code of the related error is Err002, and further the failure pattern is "successive." In this case, the CPU 201 deduces that the failure part is any of the container drive unit 207, the link member 3011, and the link shaft 7001.

The container drive unit 207 is deduced as a failure part in both of the failure patterns of "No. 4" and "No. 7." If the link member 3011 or the link shaft 7001 is the failure part, the failure pattern of "No. 4" has occurred, and hence it is deduced that the container drive unit 207 has a failure as well. That is, it is deduced that, at a timing close to the timing at which the error to be analyzed has occurred, a plurality of failures, such as the failure of the container drive unit 207 and the failure of the link member 3011, or the failure of the container drive unit 207 and the failure of the link shaft 7001, have occurred. A state in which failures of two parts simultaneously occur as described above is hereinafter referred to as "double failure." Here, from experience, the possibility that the double failure occurs is extremely low. Thus, in such a case, it is considered that, at high possibility, the failure part is the container drive unit 207 which is deduced as the failure part in both of the failure patterns of "No. 4" and "No. 7."

When a plurality of failure patterns occur, the CPU 201 performs the processing of deducing the failure part in Step S105 of FIG. 13 as illustrated in FIG. 17. The CPU 201 deduces, from the failure pattern, the failure part in the first failure deduction based on the failure deduction table of FIG. 12 (Step S105a). When a plurality of failure patterns occur, the CPU 201 performs the first failure deduction for each failure pattern so as to deduce the failure part of each failure pattern. Next, the CPU 201 deduces the failure part of the error to be analyzed based on a combination of the deduction results of the failure part from the plurality of failure patterns (Step S105b).

In the case of the failure pattern of FIG. 15A, the CPU 201 combines the container drive unit 207 which is deduced from the failure pattern of "No. 4," and the container drive unit 207, the link member 3011, and the link shaft 7001 which are deduced from the failure pattern of "No. 7." As a result, the CPU 201 deduces the container drive unit 207 having the highest deduction frequency as the failure part. Thus, the CPU 201 can notify the user or the CE that the failure can be solved by repairing the container drive unit 207 and taking actions therefor at the time of maintenance, and can provide useful information for preparing the replacement component or shortening the work time period required at the time of maintenance.

Figure 15B:
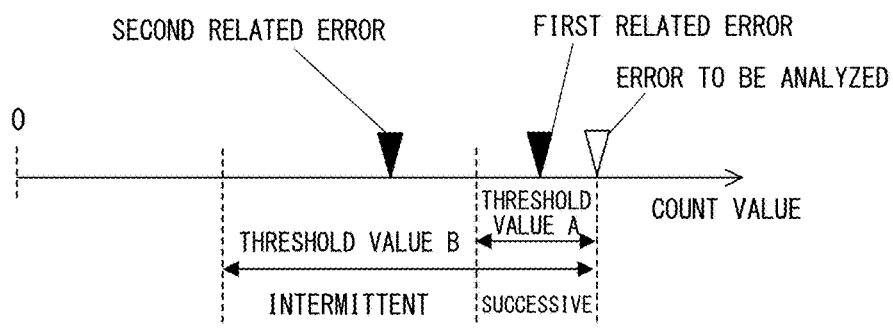

The failure pattern illustrated in FIG. 15B indicates a failure state in which the operation period between the error to be analyzed and the first related error is short, but the operation period between the error to be analyzed and the second related error is long. That is, FIG. 15B shows a case in which the failure patterns of "No. 4" and "No. 8" of FIG. 12 have occurred. Thus, the CPU 201 deduces the failure part based on the failure patterns of "No. 4" and "No. 8," by means of the processing of FIG. 13 and the failure deduction table illustrated in FIG. 12. In the case of the failure pattern of "No. 4," the CPU 201 deduces that the failure part is the container drive unit 207. Similarly, in the case of the failure pattern of "No. 8," the CPU 201 deduces that the failure part is the open/close detection sensor 214.

Further, similarly to the above, the CPU 201 performs the processing step of Step S105b of FIG. 17, which corresponds to the failure deduction processing. In this case, the deduction frequency of the container drive unit 207 and the deduction frequency of the open/close detection sensor 214 are the same and also highest. Thus, the CPU 201 deduces the container drive unit 207 and the open/close detection sensor 214 as the failure part of the error to be analyzed by the processing step of Step S105b.

This failure pattern suggests that the double failure has occurred. Thus, the CPU 201 can notify the user or the CE that it is required to repair a plurality of failures and take actions therefor at the time of maintenance. Accordingly, useful information for planning the maintenance and preparing the replacement components can be provided.

Figure 15C:
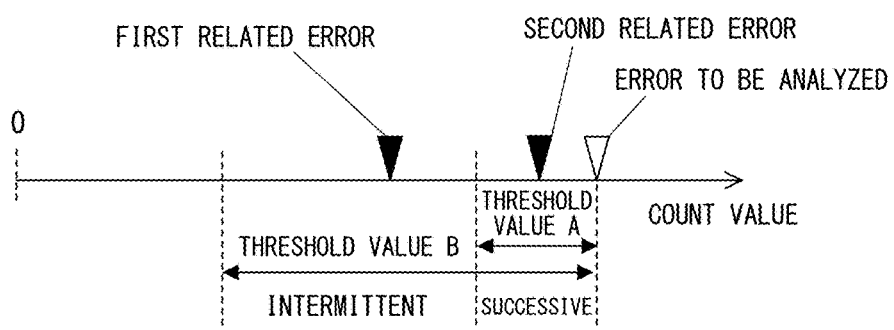

The failure pattern illustrated in FIG. 15C indicates a failure state in which the operation period between the error to be analyzed and the first related error is long, but the operation period between the error to be analyzed and the second related error is short. That is, FIG. 15C corresponds to a case in which the failure patterns of "No. 5" and "No. 7" of FIG. 12 have occurred. Thus, the CPU 201 deduces the failure part based on the failure patterns of "No. 5" and "No. 7," by means of the processing of FIG. 13 and the failure deduction table illustrated in FIG. 12. In the case of the failure pattern of "No. 5," the CPU 201 deduces that the failure part is the container drive unit 207. Similarly, in the case of the failure pattern of "No. 7," the CPU 201 deduces that the failure part is any of the container drive unit 207, the link member 3011, and the link shaft 7001.

Further, similarly to the above, the CPU 201 performs the processing step of Step S105b of FIG. 17, which corresponds to the failure deduction processing. In this case, the container drive unit 207 has the highest deduction frequency, and hence the CPU 201 deduces the container drive unit 207 as the failure part of the error to be analyzed. Thus, the CPU 201 can notify the user or the CE that the failure can be solved by repairing the container drive unit 207 and taking actions therefor at the time of maintenance, and can provide useful information for preparing the replacement component or shortening the work time period required at the time of maintenance.

Figure 15D:
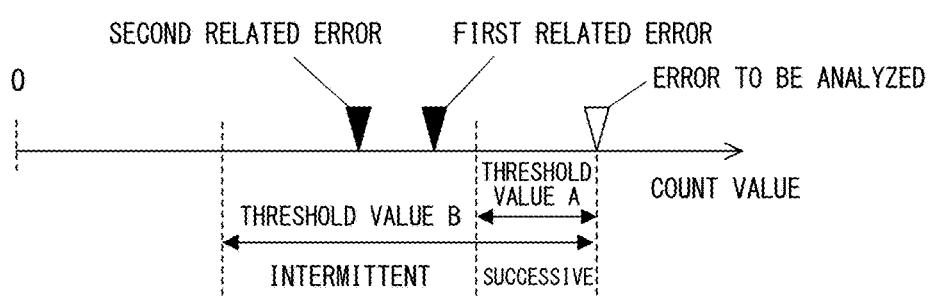

The failure pattern illustrated in FIG. 15D indicates a failure state in which the operation period between the error to be analyzed and each of the first related error and the second related error is long. That is, FIG. 15D corresponds to a case in which the failure patterns of "No. 5" and "No. 8" of FIG. 12 have occurred. Thus, the CPU 201 deduces the failure part based on the failure patterns of "No. 5" and "No. 8," by means of the processing of FIG. 13 and the failure deduction table illustrated in FIG. 12. In the case of the failure pattern of "No. 5," the CPU 201 deduces that the failure part is the container drive unit 207. Similarly, in the case of the failure pattern of "No. 8," the CPU 201 deduces that the failure part is the open/close detection sensor 214.

Further, similarly to the above, the CPU 201 performs the processing step of Step S105b of FIG. 17, which corresponds to the failure deduction processing. In this case, the deduction frequency of the container drive unit 207 and the deduction frequency of the open/close detection sensor 214 are the same and also highest. Thus, the CPU 201 deduces the container drive unit 207 and the open/close detection sensor 214 as the failure parts of the error to be analyzed based on the failure deduction processing. This failure pattern suggests that the double failure has occurred. Thus, the CPU 201 can notify the user or the CE that it is required to repair a plurality of failures and take actions therefor at the time of maintenance. Accordingly, useful information for planning the maintenance and preparing the replacement components can be provided.

Figure 16A:
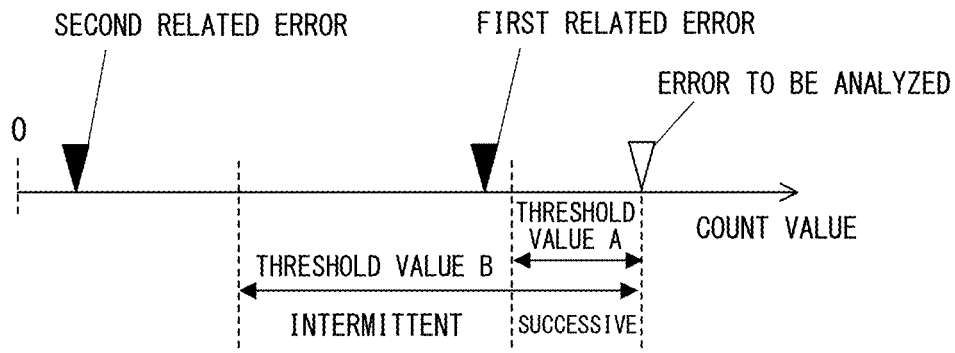
FIG. 16A, FIG. 16B, and FIG. 16C are explanatory diagrams of failure patterns.
Figure 17:
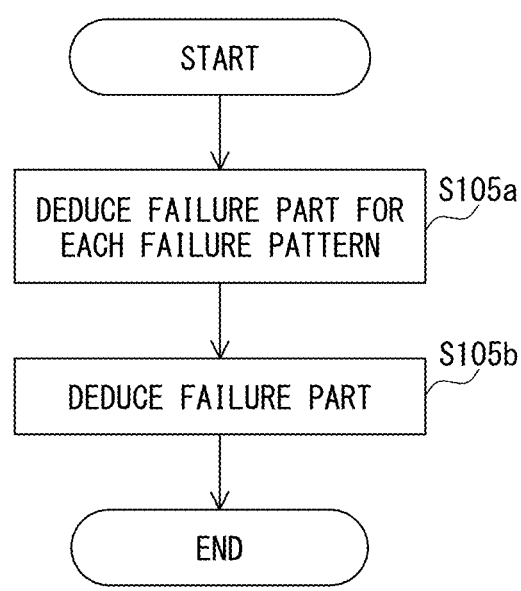
FIG. 17 is a flow chart for illustrating processing of deducing a failure part (a causal part).

The failure pattern illustrated in FIG. 16A indicates a state in which the operation period between the error to be analyzed and the first related error is short, and the operation period between the error to be analyzed and the second related error is longer than that in the failure pattern of "intermittent." In this case, a plurality of related errors have occurred, but only one related error has occurred within the threshold value B. Accordingly, the CPU 201 determines that only the first related error has occurred with respect to the error to be analyzed. Specifically, the CPU 201 determines that the failure pattern of "No. 5" of FIG. 12 has occurred. Thus, the CPU 201 deduces the container drive unit 207 as the failure part of the error to be analyzed.

Figure 16B:
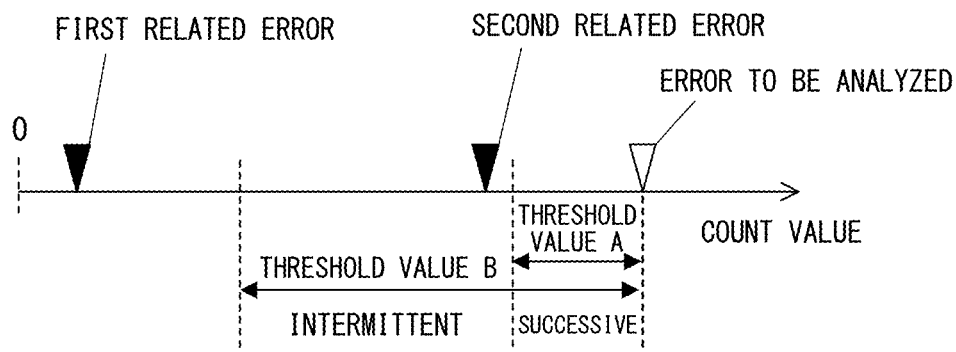

The failure pattern illustrated in FIG. 16B indicates a state in which the operation period between the error to be analyzed and the first related error is longer than that in the failure pattern of "intermittent," and the operation period between the error to be analyzed and the second related error is short. Also in this case, similarly, the CPU 201 determines that only the second related error has occurred with respect to the error to be analyzed. Specifically, the CPU 201 determines that the failure pattern of "No. 8" of FIG. 12 has occurred. Thus, the CPU 201 deduces the open/close detection sensor 214 as the failure part of the error to be analyzed.

That is, even when a plurality of related errors have occurred with respect to the error to be analyzed, the CPU 201 does not determine an error as the related error unless the error occurs within the threshold value B, and performs the failure deduction as a failure pattern in which only the related error within the threshold value B (in this example, only the second related error) has occurred alone.

Figure 16C:
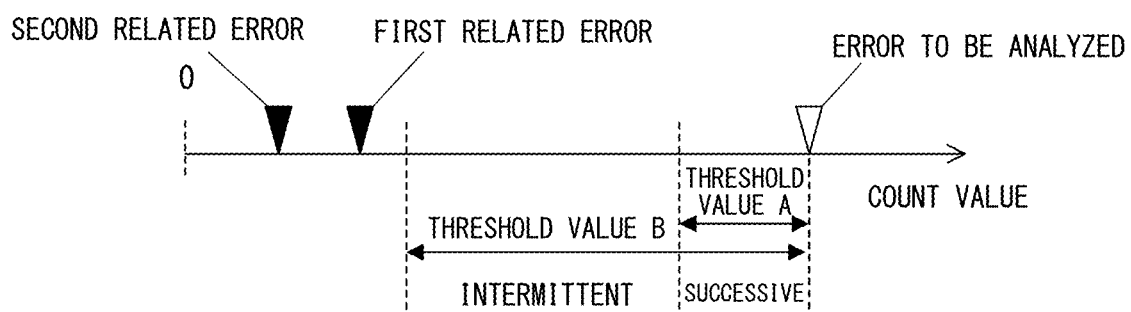

The failure pattern illustrated in FIG. 16C indicates a state in which the operation period between the error to be analyzed and the first related error and the operation period between the error to be analyzed and the second related error are both longer than that of the failure pattern of "intermittent." Thus, the CPU 201 performs the failure deduction similarly to that for the failure pattern of FIG. 11D.

In the second embodiment as described above, when a plurality of related errors occur, the deduction results obtained from the respective failure patterns are combined so that the failure part of the error to be analyzed is deduced. In this manner, as compared to a case in which the determination result of each failure pattern is individually deduced as the failure part, the failure part can be clearly deduced, and advanced information on the failure part can be acquired. That is, the CPU 201 can provide, to the user or the CE, useful information such as information for preparing components to be required for taking actions, information about a time period required for taking actions, or information leading to shortening of the time period required for taking actions, at the time of maintenance of the failure part.

Third Embodiment

A configuration of an image forming apparatus 100 and a configuration of a controller 200 in a third embodiment of the present disclosure are similar to those in the first embodiment, and hence description thereof is omitted. Further, the failure deduction in the third embodiment is performed similarly to that in the first embodiment, and hence description thereof is omitted. The third embodiment is different from the first embodiment in the contents of the error codes. Specifically, an upper limit value and a lower limit value are provided to the operation period until the reoccurrence. FIG. 18 is an explanatory table of error codes in the third embodiment. Parts different from the error codes of FIG. 9 are described.

In the failure mode A, the developer replenishment container TB does not operate, and thus no developer T is supplied to the developer storing unit 210. Thus, when the image forming apparatus 100 is restarted and reoperated after the occurrence of the error, the remaining amount detection sensor 211 detects the reduction of the amount of developer T in the developer storing unit 210, and the CPU 201 executes the developer supplying operation. Accordingly, the error of the error code Err001 occurs again within a short operation period, specifically, at the number of printed sheets of 0 sheets or more and 10 sheets or less. A threshold value of the number of printed sheets of 10 sheets is a value until reoccurrence of the error of the error code Err001, which is calculated based on an operation period of the image forming apparatus 100 until the error determination is made.

In the failure mode B, the operation state detection unit 208 cannot detect the operation state of the developer replenishment container TB, but the developer replenishment container TB operates, and hence the developer is supplied to the developer storing unit 210. Thus, even when the image forming apparatus 100 is restarted and reoperated after the occurrence of the error, the CPU 201 does not execute the developer supplying operation until the developer T in the developer storing unit 210 is consumed by the image forming operation and the remaining amount detection sensor 211 detects the reduction of the developer amount. Accordingly, the error of the error code Err001 occurs again after an operation period longer than that of the failure mode A, specifically, at the number of printed sheets of more than 10 sheets and 1,000 sheets or less.

In the failure mode C or the failure mode D, the container replacement door 213 is not opened, and hence the developer replenishment container TB is not replaced and remains empty. Accordingly, when the image forming apparatus 100 is restarted and reoperated after the occurrence of the error, the CPU 201 does not recognize that the developer replenishment container TB is empty, and performs the image formation through use of the toner in the developer storing unit 210. A replenishment retry operation is performed from the developer replenishment container TB, but no developer is supplied because the developer replenishment container TB is empty. The replenishment retry is performed a plurality of times, in the third embodiment, five times. No supply of the developer is performed, and hence the CPU 201 re-displays that the developer replenishment container TB is empty on the operation unit 205.

The CPU 201 drives the container drive unit 207 again so as to open the container replacement door 213. However, the open state of the container replacement door 213 cannot be detected, and hence the error of the error code Err002 occurs again. The error of the error code Err002 occurs again within a short operation period, specifically, at the number of printed sheets of 0 sheets or more and 50 sheets or less. A threshold value of the number of printed sheets of 50 sheets is a value until reoccurrence of the error of the error code Err002, which is calculated based on an operation period of the image forming apparatus 100 until the error determination is made.

In the failure mode E, the open/close detection sensor 214 cannot detect the open state, but the container replacement door 213 is opened, and hence the work of replacing the developer replenishment container TB can be performed. When the developer replenishment container TB is replaced, the container replacement door 213 is not opened again until the timing at which the replaced developer replenishment container TB gets empty. Accordingly, the error of the error code Err002 occurs again after an operation period longer than those of the failure modes C and D, specifically, at the number of printed sheets of more than 50 sheets and 1,000 sheets or less.

Fourth Embodiment

A configuration of an image forming apparatus 100 and a configuration of a controller 200 in a fourth embodiment of the present disclosure are similar to those in the first embodiment, and hence description thereof is omitted.

FIG. 19 is an explanatory table of error codes in the fourth embodiment. FIG. 19 shows an error code to be displayed on the operation unit 205 when the CPU 201 detects an error, detection contents thereof, an occurring phenomenon, a failure mode, a failure part, and an operation period until reoccurrence of the error at the time of reoperation. With reference to FIG. 19, a relationship between each error and failure contents and a period until reoccurrence of the error at the time of reoperation are described.

An error of an error code Err0010 is an error of the error code Err001 which has occurred in the image forming units Pa, Pb, and Pc for forming images of respective chromatic colors of yellow, magenta, and cyan. The error of the error code Err0010 is an error to be issued when, in each of the image forming units Pa, Pb, and Pc, even though the container drive unit 207 is driven, the operation of the developer replenishment container TB cannot be detected by the operation state detection unit 208.

An error of an error code Err0030 is an error of the error code Err001 which has occurred in the image forming unit Pd for forming an image of black. The error of the error code Err0030 is an error to be issued when, even though the container drive unit 207 is driven in the image forming unit Pd, the operation of the developer replenishment container TB cannot be detected by the operation state detection unit 208.

As described above, when the operation state detection unit 208 cannot detect the operation of the developer replenishment container TB even though the developer replenishment container TB is driven, any of the failure mode A and the failure mode B has occurred. In the failure mode A, the developer replenishment container TB is not driven, and in the failure mode B, the operation state detection unit 208 cannot detect the operation of the developer replenishment container TB. In the case of the failure mode A, the developer replenishment container TB or the container drive unit 207 has a failure, and in the case of the failure mode B, the operation state detection unit 208 has a failure. In any of the failures, the CPU 201 cannot detect the operation of the developer replenishment container TB, and hence the same error code is issued.

In the failure mode A, the developer replenishment container TB does not operate, and thus no developer T is supplied to the developer storing unit 210. Thus, when the image forming apparatus 100 is restarted and reoperated after the occurrence of the error, the remaining amount detection sensor 211 detects the reduction of the amount of developer T in the developer storing unit 210, and the CPU 201 executes the supplying operation of the developer T. Accordingly, the error of the error code Err0010 or the error of the error code Err0030 occurs again within a short operation period, specifically, at the number of printed sheets of 0 sheets or more and 10 sheets or less. A threshold value of the number of printed sheets of 10 sheets is a value until reoccurrence of the error of the error code Err0010 or the error of the error code Err0030, which is calculated based on an operation period of the image forming apparatus 100 until the error determination is made.

In the failure mode B, the operation state detection unit 208 cannot detect the operation state of the developer replenishment container TB, but the developer replenishment container TB operates, and hence the developer is supplied to the developer storing unit 210. Thus, even when the image forming apparatus 100 is restarted and reoperated after the occurrence of the error, the CPU 201 does not execute the developer supplying operation until the developer T in the developer storing unit 210 is consumed by the image forming operation and the remaining amount detection sensor 211 detects the reduction of the developer T. Accordingly, the error of the error code Err0010 or the error of the error code Err0030 occurs again at the number of printed sheets corresponding to an operation period longer than that of the failure mode A.

In the failure mode B, the error of the error code Err0010 to be caused by the image forming units Pa, Pb, and Pc for forming images of chromatic colors and the error of the error code Err0030 to be caused by the image forming unit Pd for forming an image of black have different operation periods (numbers of printed sheets) until reoccurrence. This difference in the operation period is caused because the counter of the number of printed sheets uniformly counts the number of printed sheets that have been printed without distinguishing color printing and monochrome printing. For example, among the 1,000 printed sheets, 300 sheets are subjected to color printing, and 700 sheets are subjected to monochrome printing.

The timing at which the error occurs again is the timing at which the failure part operates. When the timing at which the error occurs again is represented by the counter of the number of printed sheets, it is required to use the number of printed sheets considering usage states of color printing and monochrome printing. As the usage states of color printing and monochrome printing, statistically, as described above, the usage frequency of monochrome printing is higher, and the usage frequency of color printing is lower. Accordingly, the timing at which the error occurs again is different between each of the image forming units Pa, Pb, and Pc for forming images of chromatic colors and the image forming unit Pd for forming an image of black.

For example, when a failure occurs again while the image forming units Pa, Pb, and Pc for forming images of chromatic colors operate 300 times, the timing at which the error occurs again in the image forming units Pa, Pb, and Pc is within the number of printed sheets having the number of sheets of monochrome printing added thereto. Specifically, when printing of 1,000 sheets is performed by color printing of 300 sheets and monochrome printing of 700 sheets, the timing at which the error occurs again in the image forming units Pa, Pb, and Pc is within 1,000 sheets, which correspond to the number of printed sheets having the number of sheets of monochrome printing added thereto. When a failure occurs again while the image forming unit Pd for forming an image of black operates 300 times, the timing at which the error occurs again in the image forming unit Pd is within the number of printed sheets of 300 sheets because the frequency of monochrome printing is statistically higher.

A threshold value is set for each type of error to be analyzed and each type of error which occurs again, and thus a threshold value considering the usage states of the color printing and the monochrome printing is set. In this manner, the deduction accuracy of the failure part can be increased.

FIG. 20 is an exemplary diagram of a failure deduction table in the fourth embodiment. The failure deduction table of FIG. 20 is failure deduction information obtained by organizing, for each combination of the error code of the error to be analyzed and the error code of the related error, information indicating a relationship among a determination condition based on the threshold value A and the threshold value B, a failure pattern, and a failure part that has a possibility of becoming an error cause. The CPU 201 performs the failure deduction based on the failure deduction table. The failure deduction table is stored in the ROM 202, and is read out at the time of execution of the failure deduction. Details of the failure deduction table are described.

"No. 1" corresponds to a case in which the error-to-be-analyzed code is "Err0010" and the related-error code is "Err0010," and further the failure pattern is "successive." This case corresponds to the failure mode A of FIG. 19. The threshold value A for determining whether the failure pattern is "successive" or "intermittent" is 10 sheets. The CPU 201 determines that the failure state corresponds to "No. 1" when an error of the related-error code Err0010 has occurred within a range of 10 sheets or less, through use of a time of occurrence of an error of the error-to-be-analyzed code Err0010 as a reference. In this case, the CPU 201 deduces that the failure part is any of the developer replenishment container TB or the container drive unit 207 of the image forming units Pa, Pb, and Pc for forming images of chromatic colors.

"No. 2" corresponds to a case in which the error-to-be-analyzed code is "Err0010" and the related-error code is "Err0010," and further the failure pattern is "intermittent." This case corresponds to the failure mode B of FIG. 19. The threshold value B for determining whether the failure pattern is "intermittent" or "no occurrence" is 1,000 sheets. The CPU 201 determines that the failure state corresponds to "No. 2" when an error of the related-error code Err0010 has occurred within a range of more than 10 sheets and equal to or less than 1,000 sheets, through use of a time of occurrence of an error of the error-to-be-analyzed code Err0010 as a reference. In this case, the CPU 201 deduces that the failure part is the operation state detection unit 208 of the image forming units Pa, Pb, and Pc for forming images of chromatic colors.

"No. 3" corresponds to a case in which the error-to-be-analyzed code is "Err0010" and the related-error code is "Err0010," and further the failure pattern is "no occurrence." The CPU 201 determines that the failure state corresponds to "No. 3" when an error of the related-error code Err0010 has not occurred within a range of 1,000 sheets or less, through use of a time of occurrence of an error of the error-to-be-analyzed code Err0010 as a reference. In this case, there is no information for performing the failure deduction, and hence the CPU 201 deduces that the failure part is any of all parts related to the error-to-be-analyzed code Err0010 (all parts that may be a cause of the error-to-be-analyzed code Err0010). Any of all parts related to the error code Err0010 is any of the developer replenishment container TB, the container drive unit 207, and the operation state detection unit 208 of the image forming units Pa, Pb, and Pc for forming images of chromatic colors.

"No. 4" corresponds to a case in which the error-to-be-analyzed code is "Err0030" and the related-error code is "Err0030," and further the failure pattern is "successive." This case corresponds to the failure mode A of FIG. 19. The threshold value A for determining whether the failure pattern is "successive" or "intermittent" is 10 sheets. The CPU 201 determines that the failure state corresponds to "No. 4" when an error of the related-error code Err0030 has occurred within a range of 10 sheets or less, through use of a time of occurrence of an error of the error-to-be-analyzed code Err0030 as a reference. In this case, the CPU 201 deduces that the failure causal part is any of the developer replenishment container TB and the container drive unit 207 of the image forming unit Pd for forming an image of black.

"No. 5" corresponds to a case in which the error-to-be-analyzed code is "Err0030" and the related-error code is "Err0030," and further the failure pattern is "intermittent." This case corresponds to the failure mode B of FIG. 19. The threshold value B for determining whether the failure pattern is "intermittent" or "no occurrence" is 300 sheets. The CPU 201 determines that the failure state corresponds to "No. 5" when an error of the related-error code Err0030 has occurred within a range of more than 10 sheets and equal to less than 300 sheets, through use of a time of occurrence of an error of the error-to-be-analyzed code Err0030 as a reference. In this case, the CPU 201 deduces that the failure part is the operation state detection unit 208 of the image forming unit Pd for forming an image of black.

"No. 6" corresponds to a case in which the error-to-be-analyzed code is "Err0030" and the related-error code is "Err0030," and further the failure pattern is "no occurrence." The CPU 201 determines that the failure state corresponds to "No. 6" when an error of the related-error code Err0030 has not occurred within a range of 300 sheets or less, through use of a time of occurrence of an error of the error-to-be-analyzed code Err0030 as a reference. In this case, there is no information for performing the failure deduction, and hence the CPU 201 deduces that the failure part is any of all parts related to the error-to-be-analyzed code Err0030 (all parts that may be a cause of the error-to-be-analyzed code Err0030). Any of all parts related to the error-to-be-analyzed code Err0030 is any of the developer replenishment container TB, the container drive unit 207, and the operation state detection unit 208 of the image forming unit Pd for forming an image of black.

The CPU 201 uses the error code exemplified in FIG. 19 and the failure deduction table exemplified in FIG. 20 so as to deduce the failure part by executing the processing of FIG. 13 and FIG. 14, similarly to the first embodiment. The CPU 201 displays, onto the operation unit 205, information on the failure part, based on the deduction result obtained by the failure deduction processing. Not only the failure part but also maintenance-related information may be additionally displayed on the operation unit 205. The maintenance-related information is, for example, a component replacement procedure or a rough work time period required for maintenance. For example, the maintenance-related information corresponding to the failure part is stored in advance in the ROM 202. The CPU 201 reads out the corresponding maintenance-related information from the ROM 202 after the failure deduction, and displays the maintenance-related information onto the operation unit 205. Further, when the image forming apparatus 100 is connected to a network, the CPU 201 notifies the CE of the failure part and the maintenance-related information via the network.

Fifth Embodiment

In the first to fourth embodiments, there has been described a configuration in which the error-related information is accumulated in the in-machine data accumulation memory 204 in the image forming apparatus 100, and the CPU 201 reads out the error-related information from the in-machine data accumulation memory 204 so as to deduce the failure part. In a fifth embodiment of the present disclosure, description is given of a case in which those steps of processing are performed in an information processing apparatus provided externally to the image forming apparatus 100.

Figure 21:
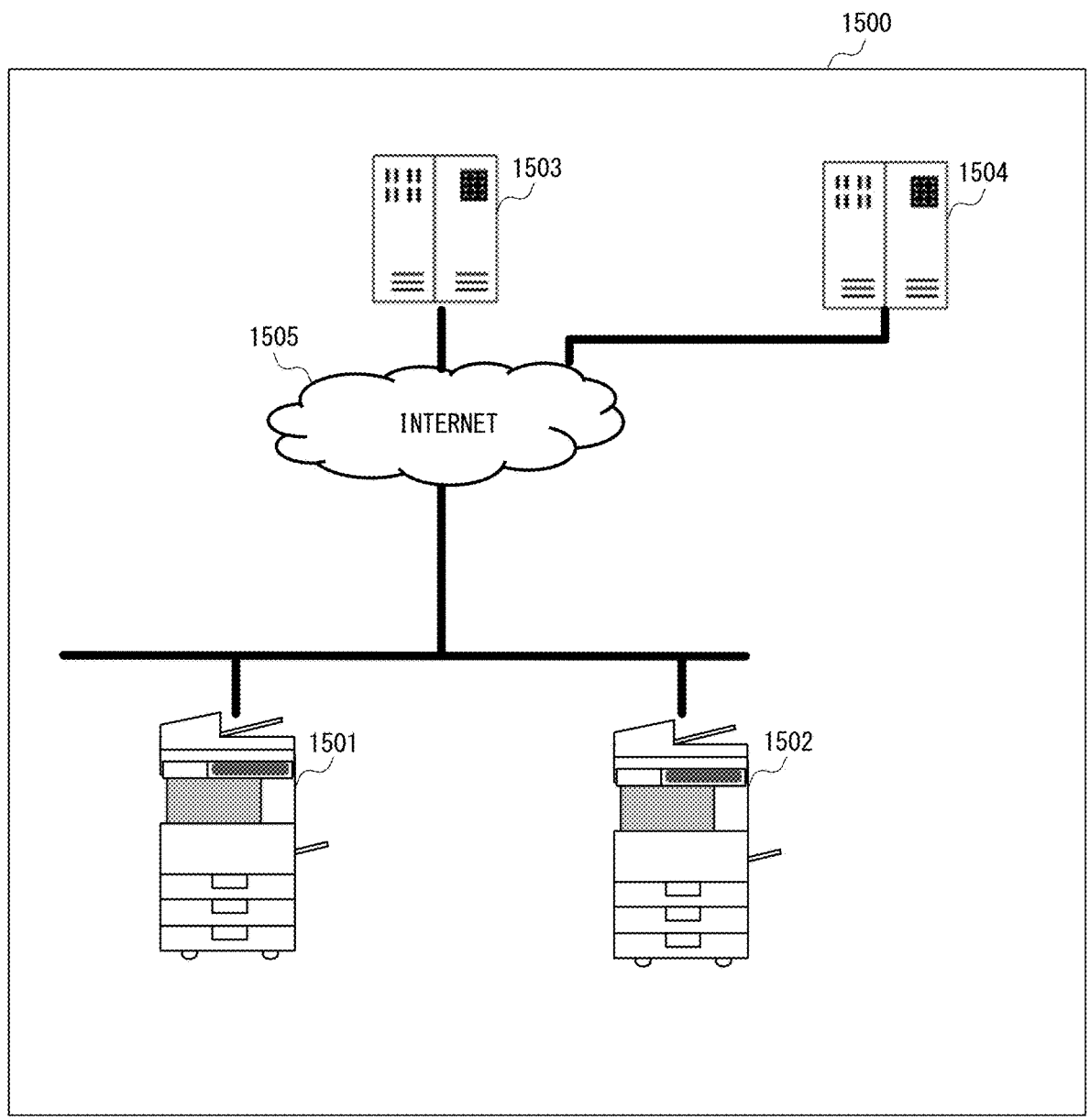
FIG. 21 is a configuration view of a failure deduction system.

FIG. 21 is a configuration diagram of a failure deduction system for deducing a failure part of the image forming apparatus with an external information processing apparatus. A failure deduction system 1500 incudes one or more image forming apparatus 1501 and 1502, a server 1503, and a management apparatus 1504. Here, two image forming apparatus 1501 and 1502 are provided in the failure deduction system 1500. The image forming apparatus 1501 and 1502 each have a configuration in which a network interface is added to the image forming apparatus 100, and create a printed product by forming an image on the sheet S. In this case, in place of the in-machine data accumulation memory 204 described in the above-mentioned example, the server 1503 functions as a storage device (database) for storing (accumulating) the in-machine data. The management apparatus 1504 functions as the information processing apparatus for deducing the failure part (part of a cause) based on the in-machine data.

The image forming apparatus 1501 and 1502, the server 1503, and the management apparatus 1504 are capable of communicating to and from each other via a network. Here, the network is an Internet 1505. The network may be a telecommunication line, such as a local area network (LAN) or a wide area network (WAN). The failure deduction system 1500 collects data from each of the image forming apparatus 1501 and 1502 and deduces a cause of a failure in each of the image forming apparatus 1501 and 1502 based on the collected data.

When an error occurs in each of the image forming apparatus 1501 and 1502, each of the image forming apparatus 1501 and 1502 transmits to the server 1503 the error-related information on the error which has occurred. The server 1503 accumulates the error-related information which is the in-machine data acquired from each of the image forming apparatus 1501 and 1502, for each of the image forming apparatus 1501 and 1502 from which the information is acquired. Further, the server 1503 transmits the received error-related information and the error-related information on an error which has occurred in the same image forming apparatus in the past to the management apparatus 1504.

Figure 22:
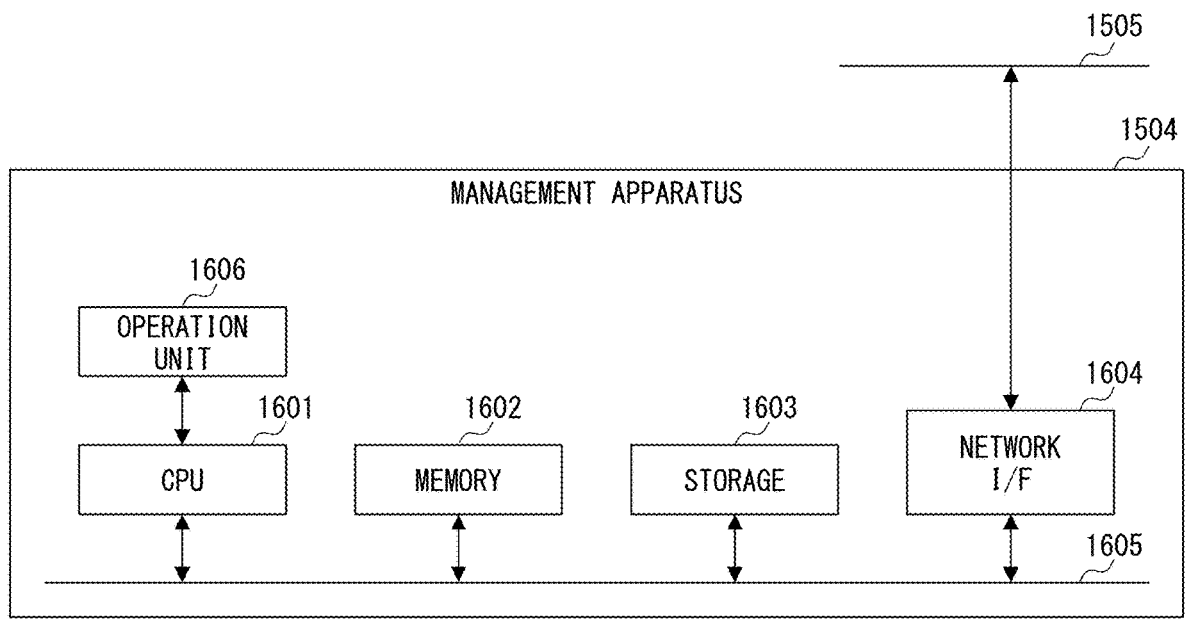
FIG. 22 is a configuration diagram of a management apparatus.

FIG. 22 is a configuration diagram of the management apparatus 1504. The management apparatus 1504 includes a CPU 1601, a memory 1602, a storage 1603, a network interface (UF) 1604, and an operation unit 1606. The CPU 1601, the memory 1602, the storage 1603, and the network I/F 1604 are connected to each other via a system bus 1605 so as to be capable of communicating to and from each other.

The CPU 1601 controls overall operation of the management apparatus 1504. The memory 1602 stores a starting program of the CPU 1601 and data required for execution of the starting program. The storage 1603 is a storage device with a larger capacity than that of the memory 1602, and is, for example, a hard disk drive (HDD), a solid state drive (SDD), or the like. The storage 1603 stores a control program or the like to be executed by the CPU 1601.

The CPU 1601 executes the starting program stored in the memory 1602 at a start-up of the management apparatus 1504. The starting program is a program for loading the control program stored in the storage 1603 into the memory 1602. The CPU 1601 executes the control program loaded into the memory 1602, and performs various kinds of control. Further, the CPU 1601 communicates to and from another apparatus such as the server 1503 via the Internet 1505 by using the network I/F 1604. The operation unit 1606 has a function similar to that of the operation unit 205. The operation unit 1606 inputs an instruction to display a failure deduction result to the CPU 1601. Moreover, the operation unit 1606 displays the failure deduction result under the control of the CPU 1601.

The CPU 1601 executes the processing of FIG. 13 and FIG. 14 so as to deduce the failure part based on the error-related information received from the server 1503. The CPU 1601 transmits the deduction result of the failure part to the server 1503. The server 1503 stores the received deduction result of the failure part.

When the instruction to display the failure deduction result is input through the operation unit 1606, the CPU 1601 acquires the deduction result of the failure part from the server 1503, and displays the information on the failure part onto the operation unit 1606. The CPU 1601 may display not only the failure part but also maintenance-related information as well on the operation unit 1606. The maintenance-related information is, for example, a component replacement procedure or a rough work time period required for maintenance. As described above, the failure part of the image forming apparatus 1501 and 1502 serving as a management target of the failure deduction system 1500 is deduced, and the maintenance work is performed.

In the image forming apparatus 100 and the failure deduction system 1500 in the embodiments described above, the failure part which has become a cause of occurrence of an error is deduced based on the error occurrence pattern (error occurrence interval) determined through use of only the count value included in the error-related information. Accordingly, without using a large amount of in-machine data, such as a detection value obtained by a sensor or a control value of the image forming apparatus, the failure part can be deduced with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-152996, filed Sep. 26, 2022, No. 2022-152999, filed Sep. 26, 2022, and No. 2022-153401, filed Sep. 27, 2022, which are hereby incorporated by reference herein in their entirety.

What is claimed is:

1. An information processing apparatus for communicating to and from a database having stored therein information on errors which have occurred in an image forming apparatus, the information processing apparatus comprising:
at least one processor configured to:
acquire, from the database, information on a certain error and information on a related error which has occurred in past before the certain error;
acquire first information related to a cumulative number of printed sheets of the image forming apparatus at a time of occurrence of the certain error, and second information related to a cumulative number of printed sheets of the image forming apparatus at a time of occurrence of the related error; and
determine a causal part of a cause of the certain error based on the first information and the second information; and
an output unit configured to output the causal part of the cause of the certain error, which is determined by the at least one processor.

2. The information processing apparatus according to claim 1, wherein the at least one processor is configured to determine the causal part of the cause of the certain error based on a difference between the cumulative number of printed sheets of the image forming apparatus at the time of occurrence of the certain error and the cumulative number of printed sheets of the image forming apparatus at the time of occurrence of the related error.

3. The information processing apparatus according to claim 1, wherein the at least one processor is configured to compare a difference between the cumulative number of printed sheets of the image forming apparatus at the time of occurrence of the certain error and the cumulative number of printed sheets of the image forming apparatus at the time of occurrence of the related error with a threshold value, and wherein the at least one processor is configured to determine the causal part of the cause of the certain error based on a result of comparison between the difference and the threshold value.

4. The information processing apparatus according to claim 3, wherein the at least one processor is configured to determine, when a first error is determined as the certain error, the causal part of the cause of the first error based on a result of comparison between the difference and a first threshold value, wherein the at least one processor is configured to determine, when a second error different from the first error is determined as the certain error, the causal part of the cause of the second error based on a result of comparison between the difference and a second threshold value, and wherein the first threshold value is different from the second threshold value.

5. The information processing apparatus according to claim 3, wherein the at least one processor is configured to determine, when the difference between the cumulative number of printed sheets of the image forming apparatus at the time of occurrence of the certain error and the cumulative number of printed sheets of the image forming apparatus at the time of occurrence of the related error exceeds an upper limit value, a plurality of causal parts of causes determined in advance as the causal part of the cause of the certain error.

6. The information processing apparatus according to claim 1, wherein the at least one processor is configured to compare a difference between the cumulative number of printed sheets of the image forming apparatus at the time of occurrence of the certain error and the cumulative number of printed sheets of the image forming apparatus at the time of occurrence of the related error with a plurality of different threshold values, and wherein the at least one processor is configured to determine the causal part of the cause of the certain error based on results of comparison between the difference and the plurality of different threshold values.

7. The information processing apparatus according to claim 1, wherein the at least one processor is configured to determine, when the related error has not occurred within a predetermined number of sheets before the cumulative number of printed sheets of the image forming apparatus at the time of occurrence of the certain error, a plurality of causal parts of causes as the causal part of the cause of the certain error.

8. The information processing apparatus according to claim 1, further comprising a selection unit configured to select information on the certain error from a plurality of information on errors stored in the database.

9. The information processing apparatus according to claim 1, wherein the at least one processor is configured to acquire, from the database, information on a certain error which has occurred in past before the certain error, wherein the at least one processor is configured to acquire third information related to a cumulative number of printed sheets of the image forming apparatus at a time occurrence of the certain error which has occurred in the past before the certain error, and wherein the at least one processor is configured to determine the causal part of the cause of the certain error based on the first information and the third information.

10. The information processing apparatus according to claim 1, wherein the at least one processor is configured to determine, when a plurality of information on related errors are acquired from the database, the causal part of the cause of the certain error based on the first information and the second information related to cumulative numbers of printed sheets of the image forming apparatus at times of occurrence of the plurality of related errors.

11. A notification method of giving a notification of a causal part of a cause of an error which has occurred in an image forming apparatus, the notification method comprising:

selecting information on an error from a database having stored therein information related to errors which have occurred in the image forming apparatus;

acquiring, from the database, information on a related error which has occurred in past before the selected error;

acquiring first information related to a cumulative number of printed sheets of the image forming apparatus at a time of occurrence of the selected error, and second information related to a cumulative number of printed sheets of the image forming apparatus at a time of occurrence of the related error; and giving a notification of a causal part of a cause of the selected error based on the first information and the second information.

12. The notification method according to claim 11, wherein the giving of the notification of the causal part of the cause of the selected error includes giving a notification of the causal part of the cause of the selected error based on a difference between the cumulative number of printed sheets of the image forming apparatus at the time of occurrence of the selected error and the cumulative number of printed sheets of the image forming apparatus at the time of occurrence of the related error.

13. The notification method according to claim 11, further comprising comparing a difference between the cumulative number of printed sheets of the image forming apparatus at the time of occurrence of the selected error and the cumulative number of printed sheets of the image forming apparatus at the time of occurrence of the related error with a threshold value, wherein the giving of the notification of the causal part of the cause of the selected error includes giving a notification of the causal part of the cause of the selected error based on a result of comparison between the difference and the threshold value.

14. The notification method according to claim 13, wherein the giving of the notification of the causal part of the cause of the selected error includes giving, when a first error is selected, a notification of the causal part of the cause of the first error based on a result of comparison between the difference and a first threshold value, wherein the giving of the notification of the causal part of the cause of the selected error includes giving, when a second error different from the first error is selected, a notification of the causal part of the cause of the second error based on a result of comparison between the difference and a second threshold value, and wherein the first threshold value is different from the second threshold value.

15. The notification method according to claim 13, further comprising giving, when the difference between the cumulative number of printed sheets of the image forming apparatus at the time of occurrence of the selected error and the cumulative number of printed sheets of the image forming apparatus at the time of occurrence of the related error exceeds an upper limit value, a notification of a plurality of causal parts of causes determined in advance as the causal part of the cause of the selected error.

16. The notification method according to claim 11, further comprising comparing a difference between the cumulative number of printed sheets of the image forming apparatus at the time of occurrence of the selected error and the cumulative number of printed sheets of the image forming apparatus at the time of occurrence of the related error with a plurality of different threshold values, wherein the giving of the notification of the causal part of the cause of the selected error includes determining the causal part of the cause of the selected error based on results of comparison between the difference and the plurality of different threshold values.

17. The notification method according to claim 11, further comprising giving, when the related error has not occurred within a predetermined number of sheets before the cumulative number of printed sheets of the image forming apparatus at the time of occurrence of the selected error, a notification of a plurality of causal parts of causes determined in advance as the causal part of the cause of the selected error.

18. The notification method according to claim 11, further comprising:

acquiring, from the database, information on error of a same type as the selected error, which has occurred in the past before the selected error;

acquiring third information related to a cumulative number of printed sheets of the image forming apparatus at a time of occurrence of the error of the same type as the selected error; and giving a notification of the causal part of the cause of the selected error based on the first information and the third information.

19. The notification method according to claim 11, wherein the giving of the notification of the causal part of the cause of the selected error includes giving, when a plurality of information on related errors are acquired from the database, a notification of the causal part of the cause of the selected error based on the first information and second information related to cumulative numbers of printed sheets of the image forming apparatus at times of occurrence of the plurality of related errors.

* * * * *